United States Patent
Sanders

(10) Patent No.: US 11,903,783 B2
(45) Date of Patent: Feb. 20, 2024

(54) APPARATUS, SYSTEMS AND METHODS FOR DENTAL TREATMENTS

(71) Applicant: Mavrik Dental Systems, LTD., Ra'anana (IL)

(72) Inventor: Daniel Sanders, Ra'anana (IL)

(73) Assignee: MAVRIK DENTAL SYSTEMS, LTD., Ra'anana (IL)

( * ) Notice: Subject to any disclaimer, the term of this patent is extended or adjusted under 35 U.S.C. 154(b) by 363 days.

(21) Appl. No.: 15/821,989

(22) Filed: Nov. 24, 2017

(65) Prior Publication Data

US 2019/0159877 A1 May 30, 2019

(51) Int. Cl.
| | |
|---|---|
| *A61C 19/06* | (2006.01) |
| *A61C 17/028* | (2006.01) |
| *A61C 17/02* | (2006.01) |
| *A61C 17/022* | (2006.01) |
| *A61C 13/15* | (2006.01) |

(52) U.S. Cl.
CPC .......... *A61C 19/066* (2013.01); *A61C 17/022* (2013.01); *A61C 17/028* (2013.01); *A61C 17/0211* (2013.01); *A61C 17/0217* (2013.01); *A61C 19/003* (2013.01)

(58) Field of Classification Search
CPC .......... A61C 17/00; A61C 17/02; A61C 17/24
See application file for complete search history.

(56) References Cited

U.S. PATENT DOCUMENTS

| | | | |
|---|---|---|---|
| 8,241,035 B2 | 8/2012 | Jones et al. | |
| 9,539,075 B2 * | 1/2017 | Sanders | A61C 19/066 |
| 2007/0031776 A1 | 2/2007 | Sakaguchi | |
| 2017/0252117 A1 * | 9/2017 | Sanders | A61L 31/16 |

OTHER PUBLICATIONS

International Search Report dated Feb. 26, 2019.

* cited by examiner

*Primary Examiner* — Ralph A Lewis
(74) *Attorney, Agent, or Firm* — FRESH IP PLC; Clifford D. Hyra; Aubrey Y. Chen

(57) ABSTRACT

A device, method, and system are provided for aiding the whitening of teeth. The device includes a mouthpiece suitable for implementing a dental treatment, wherein the mouthpiece includes one or more stock elastomeric dental cover layers suitable for forming and maintaining a treatment cavity having a vacuum fluid seal, wherein the dental cover layers includes a layer over the upper teeth and surrounding gums and/or a layer over the lower teeth and surrounding gums, wherein each of the layers includes one or more hardened sections for enabling selected/differential collapsibility when exposed to vacuum pressure; and one or more treatment supply layers wherein the treatment supply layer incorporates a heating unit for heating treatment materials and one or more flow channels in fluid communication with the treatment cavity so that the treatment supply layer can deliver and/or remove one or more treatment fluids from the one or more fluid sealed treatment cavities.

29 Claims, 10 Drawing Sheets

APPARATUS, SYSTEMS AND METHODS FOR DENTAL TREATMENTS

FIELD OF THE INVENTION

The apparatus and method of the present invention relates to dental treatments and more specifically, to teeth and gum treatments.

BACKGROUND OF THE INVENTION

The anatomical area posterior to the terminal teeth on the right and left sides of either the upper and lower jaws is referred to as the retro-molar pad. The dental tray appliance is typically fabricated to cover these terminal teeth and their terminal borders are the retro-molar pads. There is significant variability between patients as to the size of their teeth, and the shape of their dental arches. In regards to fabricating a tray to properly cover all the teeth contained within any given arch, the variable width and length of the dental arch must be considered.

The user is instructed to fill the full arch dental tray with the mild whitening chemical agent (gel) and place the tray on the teeth for up to several hours each day over the course of a minimum of one to two weeks. The custom dental trays cover all the teeth either in the upper or lower jaw. This means that the user can whiten both the front and back teeth with this treatment method using one tray for the upper teeth and one tray for the lower teeth.

It has been demonstrated that the natural saliva in the oral cavity contains a peroxidase enzyme which naturally breaks down and neutralizes hydrogen peroxide (Tenovuo and Pruitt, 1984). Utilizing custom made professional whitening trays which adapt to the teeth more closely than over the counter stock whitening trays reduces the amount of saliva that can seep into the trays and come in contact with the active hydrogen peroxide that has been placed into the trays. This reduces the amount of deactivation or breakdown by the saliva of the active gel and so increases the chemical whitening effect of this professional whitening treatment in comparison to over the counter "stock" whitening trays (which are not as well adapted to the teeth and so allow a significant amount of saliva to leak into these trays).

The custom "whitening" dental tray appliance(s) of the "home" treatment method mentioned above requires two dental visits. During the first office visit, dental impressions of the dental arches are taken in the dental office from which are fabricated custom-fitted rigid or semi-rigid thin plastic "whitening" tray(s). These trays outer limiting surfaces can either be closely contoured to the teeth or made significantly larger than the teeth. The above "home" treatment method requires the user to devote considerable time (as mentioned above) to achieve a moderate degree of teeth whitening, and due to the excessive exposure time of the teeth and gums to the whitening agents can often cause the teeth to become sensitive as well as irritating or chemically burning the gum and oral mucosal tissues of the mouth. Many patients find the effort required to achieve a sufficiently "whiter teeth" result too taxing, and there is often a very high rate of non-compliance, resulting in a poor final whitening result of the teeth.

These obvious drawbacks in the professional "home" whitening treatment method has in recent years given rise to professional dental treatments referred to in the dental field as "in office" or "power whitening" treatment. This treatment method involves applying in the dental office, utilizing and under the supervision of professional dental staff, more highly concentrated (and more caustic) formulations of various teeth whitening chemical agents than were previously used for the "home" whitening treatments. To protect the gingival tissues from these highly concentrated whitening agents, a "paint-on dam" or protective coating (a layer of material applied in a strip at the gum line which is placed in a scalloped shape to contour to the gum-line) is applied by hand (very time-consuming) and hardened with a standard dental UV light. Additionally, an uncomfortable lip and cheek retractor device is inserted into the mouth along with cotton rolls (and gauze as needed) in order to try and protect the rest of the oral tissues of the mouth from these highly concentrated and caustic whitening agents.

These precautions are necessary, as contact of these highly concentrated chemical whitening agents used in the "power" whitening with the above mentioned soft tissues of the mouth will, in a few seconds, cause significant chemical burning and pain to the patient. Typically, three applications of the whitening agent (for approximately 20 minutes each) limited to only the buccal (front) surfaces of only the anterior teeth are made, wherein the previous application is washed and suctioned off the teeth and replaced with the next application. The lingual (inner) surfaces of these anterior teeth and the posterior teeth in their entirety are not "whitened" using this technique. The "power" whitening technique does not utilize a tray device of any kind. The whitening agent is applied in an open paint-on manner onto the external buccal surfaces of the limited teeth to be treated and so does not have the whitening advantages of the compression effect of the whitening gel using trays as described previously (home whitening technique).

Over the past two decades there has also been a shift in "in office" or "power whitening" treatments to utilize "light activated" whitening agents over the older whitening agents that did not require light activation to potentiate an oxidation (whitening) chemical reaction. These light activated whitening agents are chemically formulated to oxidize when exposed to a concentrated intense light source which acts as a catalyst to potentiate the chemical oxidation of these whitening agents.

There is much controversy in the dental field as to whether the use of light activation of the whitening gels enhances the chemical whitening effect of these gels. It has been postulated that it is actually the heat generated by the light and not any specific wavelength of the light that actually increases the chemical activity and hence the whitening activity of these whitening gels.

The light emitting devices currently being used in the dental field can, in general, only reach the anterior portion of the mouth and only after the lips and cheeks have been retracted using devices as were described above. This is due to the limited natural elasticity of the lips and muscles surrounding the mouth which limit the number of teeth that can comfortably and safely retracted and exposed to the light source and the highly concentrated "power" whitening chemical agents while still protecting the soft tissues of the oral cavity from these highly caustic whitening agents.

As mentioned above, these limitations typically result in "power whitening" treatments of, at a maximum, the front upper 10 and front lower 10 teeth, (the upper and lower central and lateral incisors, canines and first and second bicuspids) for a maximum treatment of 20 teeth (there are typically 28-32 teeth in the human mouth). Due to the limitations already mentioned, it is common practice to find that only the top 8 and bottom 8 front teeth are "power"

whitened for a total of 16 (only 50%) of the teeth often present in the patient's mouth, a distinct disadvantage of this teeth whitening technique.

A further limitation of the treatment area is that in general the lights used in the "power" whitening can be positioned by the operator into the patient's mouth to illuminate mainly the buccal (front or outer) surfaces of the anterior teeth while only poorly illuminating the lingual (back or inner) surfaces of these front teeth. It is also extremely difficult for the dental practitioner to apply the "paint-on dam" protective coating at the gum-line of the lingual "inner" surfaces of the anterior teeth and almost impossible for the dentist to isolate the very active tongue with the current isolation devices and materials available in the dental field. This means that these sensitive oral tissues are extremely difficult to isolate from the caustic chemical burning of the highly concentrated "power" whitening agents.

The above explains why whitening of the inner (lingual) surfaces of the anterior teeth are rarely done in this technique and the posterior teeth are never whitened at all with this technique. Moreover, the "power" whitening of only the buccal (outer) surfaces of the anterior teeth adversely affects the overall final whitening result, as the natural enamel layers of the teeth (naturally found on both outer and inner surfaces of all the teeth) are naturally somewhat translucent. This allows for the "darker" shade of the inner (lingual) untreated surfaces of the teeth to "show through" to the front surfaces. This naturally occurring optical effect can diminish the overall final whitening effect of these teeth when using the current "power" whitening treatment method.

Advantages of the "in office" or "power" whitening treatment method compared to the "home" treatment include: a. It allows for the more rapid whitening of the teeth compared to the "home" treatment due to the use of more highly concentrated whitening agents. This reduces significantly the over-all treatment time; b. As it is done "in-office", there is less of a non-compliance issue with the patient as is often encountered with the lengthier "home" treatment; and c. The shorter treatment time tends to minimize the irritation or sensitivity of the teeth, as the teeth are exposed to these agents for a shorter period of time, though some users do experience teeth sensitivity due to the more concentrated strength of the chemical oxidizing agents used in this treatment method and the often encountered unwanted leakage of small amounts of the highly concentrated whitening agents past the protective barriers placed by the dental practitioner onto the oral tissues during the "power" whitening treatment.

Disadvantages of the "in office" treatment method compared to the "home" treatment include: a. As noted above, only the front teeth can be comfortably whitened with the "in office" method, as compared to the "home" treatment which allows for the whitening of both the front and back teeth; b. As mentioned above, the more highly concentrated formulations of the whitening oxidizing agents are more caustic to the hard (tooth) tissue and soft (gums, oral mucosa, tongue) tissue of the mouth and so require the application of special hand-applied gingival and oral mucosal barriers by professional dental staff under the supervision of a dentist or by the dentist him/herself on the gingival and oral mucosal tissues of the areas to be treated in order to protect them from these highly concentrated whitening chemicals. This is a time-consuming procedure that often needs to be reapplied during treatment to properly protect the soft tissues of the mouth form these highly concentrated whitening agents. Even with all this isolation effort, as mentioned above, it is typical to find some leakage and burning of the oral tissues of the patient resulting in temporary pain and discomfort to the patient; c. Due to the inaccessibility of the posterior teeth and difficulty (due to the cheeks and tongue) of the posterior areas of the mouth, these whitening treatments invariably are restricted or limited (due to the extreme difficulty of protecting the oral soft tissues surrounding the posterior teeth) to the anterior segments of the mouth; d. Whitens mainly the front (buccal) surfaces of the anterior teeth and only rarely is used to whiten the inner (lingual) surfaces of the anterior teeth; and e. It is common to observe a more marked "relapse" effect (loss of whitening result) after treatment with this "in office" treatment method as compared to the "home" treatment method. This is due to the short duration of treatment (as compared to the much longer treatment time of the "home" treatment method) and the resultant rehydration of the teeth after treatment (the "power" whitening process tends to temporarily dehydrate the teeth which temporarily potentiates the initial whitening result). This means that the typical final "whitening" result using the "power" whitening technique is significantly poorer then the final "whitening" result that can be obtained when the patient is highly compliant and uses the "home" whitening technique properly.

SUMMARY OF THE INVENTION

There is provided, in accordance with an embodiment of the present invention, an apparatus, device, method and system for aiding teeth whitening, teeth sensitivity, anti-decay, oral hygiene, gum treatments and more. The apparatus may include a mouthpiece suitable for implementing a dental treatment, one or more fluid sealed treatment cavities having a vacuum below ambient pressure, wherein each dental cover layer includes a layer over the upper teeth and surrounding gums and/or a layer over the lower teeth and surrounding gums; and one or more treatment supply layers wherein the treatment supply layer has one or more flow channels in fluid communication with the treatment cavity so that the treatment supply layer can deliver and/or remove one or more treatment fluids to or from the treatment cavity, optionally high volume quantities, and wherein each dental stock layer includes one or more hardened sections for enabling selected/differential collapsibility when exposed to vacuum pressure.

In some embodiments, the dental cover vacuum is formed using a continuous or selectively sustainable sealing mechanism that includes a body of the device that includes a sealing rim or apron (peripheral roll border) formed of a compressible material that incorporates in its design one or more sealing plugs at the rear opening(s) of each of the dental cover layer, wherein the continuous sealing mechanism sufficiently seals each of the treatment areas that cover the dentulous or partially dentulous gum ridges of the upper and or lower jaws of the mouth.

In some embodiments the dental cover layers (soft body of the mouthpiece device) are made of soft elastomeric materials that easily collapses and can be readily conformed to closely adapt to the gum ridge anatomy of a wide variety of different gum anatomy morphological variance.

In some embodiments the mouthpiece may include one or more hardened sections that function as an exo-skeleton coupled to the soft body mouthpiece.

In some embodiments the mouthpiece may include one or more hardened sections that function as endo-skeleton embedded in the soft body mouthpiece.

In some embodiments the dental cover layers incorporate rigid stiffening elements on both the buccal and lingual/ palatal aspects of the covers. These rigid elements are designed to resist the collapse of the specific areas of the covers (when a vacuum force is applied to the inside treatment cavities of said covers) to which they are attached (externally as an "exoskeleton") so as to create cover layers (a soft body) that is/are differentially collapsible/conformable to the gum ridge or ridges they cover when inserted into the mouth. This allows for the cover layers to intimately adapt (by collapsing and being sucked onto) to the gum ridges at their peripheral roll border rims or apron segments and provide a good vacuum fluid seal of the covers to the sides of the upper and or lower gum ridges whilst those areas of the cover layers (soft body of the device) to which the rigid stiffening members are attached to, resist collapse and maintain a negative space between the teeth and surrounding gums covered by the soft body of the cover layers.

This unique design of the mouthpiece device of the present invention allows for significant volumes of treatment materials to be flowed inside the treatment cavities of the soft body of the cover layers (both on the buccal and lingual/palatal aspects of the soft body cover layers) and remain present on the surfaces of the teeth and our surrounding gums covered by cover layers and contained within the treatment cavities when a vacuum force is applied and maintained to the mouthpiece to create and maintain a fluid seal of the mouthpiece.

The unique design of the mouthpiece allows for treatment material to be flowed into the mouthpiece treatment cavities under positive pressure while maintaining both a fluid seal around the peripheral roll borders of the mouthpiece to the gum ridges and maintaining a robust negative space for the treatment fluids to fully cover the teeth and or surrounding gums throughout the treatment.

In some embodiments these rigid stiffening elements may be embedded (internally as an "endo-skeleton") into the cover layers (e.g. the cover layers may be over-molded onto the rigid stiffening elements as is well known in the art).

In some embodiments, the sealing mechanism is adapted to prevent saliva from entering the treatment cavity and is adapted to prevent treatment material from exiting the treatment cavity.

In some embodiments, the treatment supply layer contains within it (or inserted into it) one or more heaters for heating a treatment material, for heating at least a portion of the treatment cavity; or both.

In some embodiments, the device includes a handle integrated into the treatment supply layer suitable for: inserting the one or more dental cover layers over the upper and/or lower teeth and surrounding gums, for adjusting the position of the one or more dental cover layers, for removing the dental cover layers after a dental treatment is completed, or any combination thereof.

In some embodiments, the device includes a power line (or inserted into it) for delivering an electrical current to the treatment supply layer and one or more tubes for delivering and/or extracting one or more treatment materials to the treatment supply layer, the handle includes the power line; or both.

In some embodiments, the dental cover layers substantially cover the gum ridges as previously noted.

In some embodiments, the device includes two dental cover layers for covering the upper teeth and surrounding gums and the lower teeth and surrounding gums; at least one treatment supply layer interposed between the two dental cover layers to enable the upper teeth and lower teeth to be treated simultaneously; wherein the device includes one or more breathing vents in the treatment supply layer suitable for providing an air passage into and out of the mouth during a dental treatment.

In some embodiments, the handle includes one or more inflow tubes for flowing one or more treatment materials into the treatment supply layer(s); and one or more outflow tubes for flowing one or more treatment materials out of the treatment supply layer(s).

In some embodiments, the mouthpiece may include: one or more delivery holes for flowing a treatment material from the treatment supply layer to the treatment cavity, and one or more drainage holes for flowing a treatment material from the treatment cavity to the treatment supply layer; and wherein the treatment supply layer includes one or more delivery channels for transporting a treatment material from an inflow tube to the treatment cavity and one or more drainage channels for transporting a treatment material from one or more drainage holes to an outflow tube.

In some embodiments, the dental cover layer includes a compressible rear cavity plug or plugs suitable for sealing the cavity to prevent material flow out of the rear sides of the vacuum forming cover layer.

In some embodiments, the device includes one or any combinations of the following design features: the dental cover layer incorporates highly compressible peripheral roll border aprons or rims to conform to the gum ridges; the treatment supply layer includes within it (or inserted into it) one or more individually controllable heating elements; the dental treatment layer is between upper and lower dental cover layers and the mouthpiece is shaped to mirror a hinge axis angle to facilitate natural jaw movement.

In some embodiments, the above described vacuum fluid seal is formed via the treatment supply layer, by reducing the pressure in the dental treatment cavity or cavities below ambient pressure.

In some embodiments the device includes the ability to flow into the treatment cavities water or a water/air mixture or air alone between each gel application. This allows for the teeth and our surrounding gums inside the treatment cavities to be washed clean and dried at the end of each treatment material (fluid or gel) application.

In some embodiments, the device may include a pumping system, for pumping one or more treatment materials into the mouthpiece; a multi-position flow control module; and a control unit for automating the dental treatment.

In some embodiments the device allows for the automation of the treatment to include automated multiple cycles of treatment material application (fluid or gels) followed by a washing/drying cycle which then nay be repeated automatically for a variable number of cycles per treatment.

In some embodiments, the device includes a disposable elastomeric dental gum guard drape component for additional protection against treatment materials that can be inserted onto the gum ridges and overlaid by the mouthpiece device without damaging the device's ability to achieve a vacuum fluid sealed treatment cavity or cavities for the inflow and removal of treatment materials into said treatment cavities without any of said materials leaking out.

In some embodiments, the device includes a disposable dental gum guard drape component which includes a gum treatment layer on its inner surfaces for the delivery of one or more therapeutic material to the gums.

According to some embodiments, a dental gum guard drape is provided, that may include a flexible elastomeric arch shaped drape designed to conform substantially to the gum ridge anatomy, and having pre-configured cut-out holes for customized insertion over and through the teeth which acts to provide a fluid sealed dry field wherein when the teeth are inserted through said holes, said individual holes snugly grip circumferentially the erupted anatomical crown portions of the teeth at the gum line positions of these teeth so that the teeth remain substantially exposed and the drape provides a fluid sealed barrier drape around (and including in between the exposed teeth) to the gum ridge itself The dental gum guard drape having individual cut out holes for the insertion therethrough of the crown sections of erupted teeth feature drape material between the teeth in the interproximal spaces between the teeth referred to as interdental or inter-proximal tension bridges. These bridges allow for a snug circumferential fit of the drape around the "necks" (at the level of the cemento-enamel junction of the teeth) or more commonly referred to as the level of the gum line of the teeth.

This intimate circumferential fit provides for an effective fluid sealed barrier to protect the gum tissue covered by the drape from even high concentrations of peroxide gels. It also provides for a fluid seal of the drape so that treatment materials or medicines placed under the drape and onto the gum tissue or delivered into the sulcus (gum pockets) of healthy or diseased gum tissue will remain in place whilst being impervious to saliva dilution and washout. This functionality of the gum guard drape increases the therapeutic window of action of the treatment materials or medicines placed underneath the drape and can directly impact on the efficacy of said materials or medicine to heal the gum tissue.

In some embodiments, the disposable dental gum guard drape includes a treatment material layer on one or more surfaces, wherein the treatment material is suitable for neutralizing treatment materials.

In some embodiments the disposable dental gum guard drape incorporates within it built in channels on both its buccal, occlusal and lingual/palatal aspects which may be pre-filled with light curable resin materials. When inserted and placed onto the gum ridge (by inserting the teeth holes through the anatomical crown portions of the teeth) the gum guard drape can be snugly adapted to the patient's particular gum ridge anatomy by pressing and molding the drape to the underlying ridge on both its buccal and palatal/lingual aspects and polymerizing and curing the light curing material contained within the channels on these respective aspects of the drape so as to more intimately conform the drape to the particular ridge it covers. Additionally, the drape's channels pre-filled with light curable resin materials may extend (when inserted onto the gum ridge) into the natural anatomical undercuts of the gum ridge (e.g. the muco-buccal fold as an example).

When the drape is stretched and pressed into these natural undercuts of the gum ridge and the resin is cured in situ the hardened channels sifting in the gum ridge undercuts create a mechanical anchoring of the new position of the drape.

The borders of the teeth holes may be stretched as well (as they are all integral to the drape structure) by stretching the drape into the undercuts of the gum ridge and each of the individual occlusal tooth hole borders can therefore be adjusted to a new position determined by the operator and "frozen" by the operator to more closely adapt (on a tooth by tooth basis) to the particular gum line of the patient. This is an advantage when whitening the teeth as it allows for the selective full exposure of all the enamel surfaces of the teeth to the whitening materials applied to them while effectively protecting the surrounding gums of the gum ridge that are contained within the mouthpiece and exposed to high concentration peroxide treatment fluids/gels.

In still further embodiments, a method is provided for executing dental treatments, including positioning a mouthpiece including one or more dental cover layers over upper teeth and surrounding gums and/or lower teeth and surrounding gums; applying a vacuum to the selectively deformable/collapsible dental cover layer or layers so that a fluid sealed treatment cavity or cavities having a pressure below ambient pressure is formed around the teeth and surrounding gums; and flowing one or more treatment materials into the fluid sealed treatment cavity or cavities.

In some embodiments, the process includes one or any combination of the following steps: setting up a pump module to connect to a mouthpiece designed for a teeth whitening treatment; configuring treatment settings on a control device coupled to the pump module; applying a flow control module to cause a vacuum between the mouthpiece and the patient's gum ridge anatomy; inserting a gum guard drape or drapes over and through the anatomically erupted crown portions of the teeth so as to substantially cover and fluidly seal the gum anatomy surrounding the teeth; apply flow control module to automatically manage delivery of materials in accordance with said treatment settings, and/or using a flow control module to remove treatment materials from the mouthpiece.

In some embodiments, the method includes a step of applying flow control to change flow patterns during a treatment, to optimize conformance to a treatment plan as previously noted.

In some embodiments, the method includes a step of monitoring the treatment to track conformance to a treatment plan.

In some embodiments, the method includes a step of monitoring the treatment to identify problems during a treatment.

In some embodiments, the treatment materials differ with respect to the temperature of the materials, with respect to the concentration of the materials, the type of the materials, the viscosity of the materials or any combination thereof.

The treatment device, according to some embodiments, may be a stock item that may be provided is several stock sizes, and which is either reusable or a one-time throw-away item, may include a single dental arch or double dental arch mouthpiece with breathing tubes incorporated into the body of the device that allow the patient to breathe through the mouth when the double dental arch mouthpiece is inserted into the oral cavity. The mouthpiece device has flexible side walls with a highly collapsible circumferential deformable apron or roll border that adapts to the upper and lower alveolar gum ridges of the mouth. Each arch formed treatment cavity contains at its distal end (right and left sides) a rear sealing plug feature. The plug is made of a highly deformable material which when bitten into tightly conforms to the anatomy of the crown segment of the tooth that is biting into it. When a vacuum force is applied to the device via the supply layer, the plugs in conjunction with the readily deformable (collapsible when a vacuum force is applied to them) circumferential peripheral roll border rims of the device allows for the mouthpiece device to closely adapt to the upper and lower alveolar gum ridges and create an intimate continuous or selectively sustainable fluid seal of the mouthpiece to these structures.

As previously noted, the rigid elements of the device are designed to prevent the collapsible deformation of those areas of the device that correspond internally to the treatment cavities surrounding the teeth and immediate surrounding gums to maintain an internal negative space around the teeth and surrounding gums when treatment materials are flowed into them whilst a vacuum force has been applied to the device and a fluid seal has been achieved to said treatment cavities.

The mouthpiece device also incorporates in its middle layer, multiple flow channels with outlets and inlets and one or more heating elements (that may also be inserted into it) whose temperature can be individually controlled by a microprocessor unit contained within a control unit. In some embodiments, these heating elements may include a spiral metal component covered by a metal tube. The spiral metal component may be hollow and contain an electrical heating element which when electrically heated conductively heats the surrounding metal elements.

Treatment material flowed through the sheathed spiral component will be conductively heated as it flows directly through the sheathed heated spiral element. Printed circuit boards (which may be flexible) can be incorporated to provide temperature control of the heating elements and so control the resultant heating and temperature of the gel flowed through said heating module and exiting it.

The entire heating module unit may be in some embodiments sheathed inside a housing (of plastic or other suitable materials) to allow comfortable handling of the heating module unit when it is heated.

The microprocessor unit can control electrical power, time duration, alarms, sensors, individual or multiple heat emitting elements, pumps, motors, and other controls. As previously noted, several different types and sizes of disposable customizable or stock separate gum protector/guard elements can be inserted into the mouth prior to inserting the mouthpiece and used in conjunction with the device without damaging the ability of the device to form and maintain fluid sealed treatment cavities.

A pump component can be used to create a vacuum within the treatment cavities of the mouthpiece device. Differing concentrations of different treatment materials can be delivered in a controlled manner via said pump and flexible tubing connected to a heating module unit that is fluidly connected to the mouthpiece device.

Pressure sensors are integrated into the system to monitor volume and flow rate of the gel and vacuum seal integrity of the mouthpiece in the mouth while treatment materials are delivered into the mouthpiece. The whitening gel agents can similarly be removed from the device in a controlled manner by said system. Similarly, fresh water or a mixture of water and air or air alone can be delivered to and removed from the mouthpiece device to rinse or flush away any remaining gel residue from the teeth and dry the teeth and or surrounding gums and the inner surfaces of the treatment cavities of the mouthpiece after each gel application.

An optional tooth shade matching sensor unit to record pre-treatment and post-treatment tooth shade values may be incorporated into the control unit.

According to various aspects of the invention, the device for providing a dental treatment may include a deformable gum sealing portion for covering a gum ridge; a distal tooth sealing portion, wherein the gum sealing portion and the distal tooth sealing portion define a gap between at least a portion of the device and the tooth over which it lies; and at least one fluid conduit portion for passing a fluid into or out of the treatment cavity; wherein the placement in a patient's mouth over a plurality of teeth and surrounding gum, the gum sealing portion contacts and deforms against a gum ridge of the patient for forming intimate contact with the gum ridge, and the distal tooth sealing portion deforms against distally located teeth for substantially defining a seal at the distal tooth or teeth, so that a fluid can be introduced, removed, or both from the treatment cavity while maintaining a fluid seal with the deformable gum sealing and tooth sealing components when a vacuum force is applied to the device.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

Figure 1A:
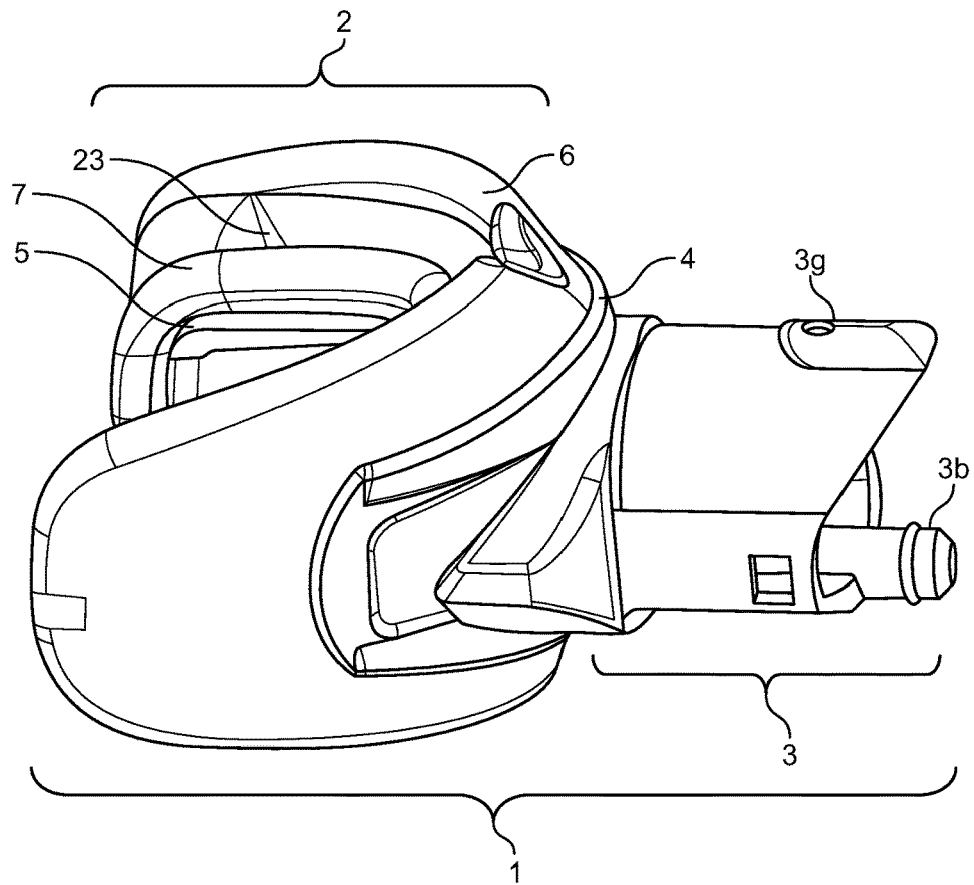
FIG. 1a is a side view of one embodiment of the mouthpiece 1 of the present invention comprised of four main components; namely a soft body 2 made of elastomeric materials such as silicone or thermoplastic elastomers, a mouthpiece coupler 3 made of hard plastic materials; a rigid stiffening element 4 on the buccal aspects of the soft body 2 and a rigid stiffening element 5 on the lingual/palatal aspects of the soft body 2, according to some embodiments.

It will be appreciated that for simplicity and clarity of illustration, elements shown in the drawings have not necessarily been drawn to scale. For example, the dimensions of some of the elements may be exaggerated relative to other elements for clarity. Furthermore, certain quantities of elements have been depicted, in accordance with specific embodiments, however other embodiments may be provided with fewer or more elements, such as holes, pins, heating elements, tubes etc. Further, where considered appropriate, reference numerals may be repeated among the drawings to indicate corresponding or analogous elements throughout the serial views.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

Preferred dental treatments employ one or more chemicals, medications or other treatment related materials, optionally low, medium or high volumes, that interact with the teeth and/or gums. Embodiments of the present invention enable increasing the efficiency and effectiveness of the dental treatments, by applying a vacuum to a mouthpiece that is composed of soft collapsible materials, and hardened sections that are resistant to collapse. Such embodiments enable delivery of selectively engineered or designed sealed treatment cavities or zones where treatment materials may be optimally applied, and may also be prevented from escaping outside of the sealed treatment cavity. Non-limiting embodiments of the invention include a dental treatment apparatus or device, method and system, where teeth whitening, gum treatment, tartar removal, teeth desensitizing, anti-decay, and other treatments can be delivered to one or more selected target treatment cavities and the hard or soft tissues contained therein.

Embodiments of the present invention include a dental treatment mouthpiece that may include a single or double dental arch cover layers. The mouthpiece may include one or more dental cover layers for covering the upper teeth and surrounding gums and/or the lower teeth and surrounding gums. A dental cover layer preferably is an arch, such as a dental arch, configured for fitting over either the bottom teeth or the upper teeth and respective surrounding gums. For example, the mouthpiece may include an upper dental cover layer and a lower dental cover layer (e.g., the mouthpiece may include a double dental arch). The dental cover layer may have a dental arch treatment cavity that covers the teeth and surrounding gums. A particularly preferred mouthpiece includes two dental cover layers, each having a dental arch treatment cavity, where the two dental cover layers are co joined to create a single device. It will be appreciated, according to the teachings herein, two co-joined dental cover layers may be joined via one or more additional layers, such as one or more treatment supply layers.

The mouthpiece, according to some embodiments of the present invention, allows for the use of generic or stock deformable mouthpieces in patients, such that the variable widths and lengths of the patients' full dental arches can be handled, without the need to fabricate a custom-made mouthpiece for each patient. When using such stock mouthpieces, embodiments of the present invention enable the maintenance of a continuous vacuum fluid seal of the mouthpiece to the given dental arch gum ridge onto which it is placed. The distal plugs of the mouthpiece are highly deformable so that when the patient is instructed to bite down into the mouthpiece, the plugs will readily deform around the coronal segments of the terminal tooth or teeth. This intimate fit of the improved mouthpiece of the present invention to any given dental arch is independent of the length and width of the dental arch to which it is to be fitted and independent of the position of the right or left terminal teeth of any given dental arch to their respective retro-molar pads.

The dental treatment mouthpiece may be reusable or disposable after a single use. The mouthpiece may be constructed in various generic or stock sizes (e.g., small, medium, large, extra-large) or may be customized, for covering both the upper and lower teeth and respective surrounding gums of the gum ridges. The mouthpiece may include the insertion into it of one or more heating elements for heating a dental treatment fluid or material for heating treatment fluid materials prior to flow into the mouthpiece, optionally using inline direct conductive heating provided by a heating module unit fluidly connected to the mouthpiece device of the present invention.

The device may be employed in a system including one or more control units, such as a control unit including a microprocessor. The control unit may be an external control unit. The control unit may control the temperature of one or more heating elements. The control unit may control a mouthpiece having a double dental arch each having a dental arch treatment cavity so that the simultaneous treatment of both the upper and lower teeth and/or respective surrounding gums are controlled.

An arch of the dental mouthpiece (e.g., each arch of a co joined double arch mouthpiece) preferably has a dental cover layer with an arch-shaped well or other design suitable for forming a treatment cavity that may contain one or more dental treatment fluids. For example, the arch-shaped well treatment cavity may contain a dental fluid that includes a predetermined concentration of an active ingredient. The active ingredient may be any chemical that is suitable for whitening teeth in situ, or for performing other dental treatments. A particularly preferred active ingredient for tooth whitening, for example, includes one or more peroxides. The active ingredient may be activated or have a reactivity that is otherwise accelerated or potentiated (e.g., catalyzed or otherwise) by heat. The treatment fluid (e.g., the treatment fluid including an active ingredient may be delivered via a pumping system (e.g., an automatic pumping system), via a vacuum, or both, into the treatment cavity sections of the mouthpiece. Preferably, while in the treatment cavity, the treatment fluid substantially covers the natural crown portions of the teeth (e.g., the teeth subject to a treatment). Alternatively, while in the treatment cavity well, the treatment fluid may also substantially cover that portion of the gum tissue surrounding the crown portions of the teeth (e.g.; the gums subject to a treatment).

The sealed compartment (i.e., sealed treatment cavity) around the teeth and surrounding gums formed by the treatment cavity well of the dental cover layer may be employed for delivering one or more treatment materials to the erupted crown portions of a plurality of teeth. For example, a sequence of two or more different treatment fluids or cleaning/washing fluids or air flow may be passed through the sealed compartment. Without limitation, the treatment fluids may include one or more preparation fluids, one or more active treatment fluids, one or more medications, one or more neutralization fluids, one or more rinsing fluids, air flow in combination with rinsing fluids or air flow alone for drying, or any combination thereof. Preferably the treatment fluids include one or more whitening treatment fluids, rinsing fluids, medications, or other treatment materials. The whitening treatment fluid, for example, may include any art known active and/or any non-active ingredients for whitening teeth. Without limitation, the whitening treatment fluid, for example, may include one or any combination of the features of the fluid compositions described in U.S. Pat. No. 7,189,385 (see e.g., column 1, line 2 through column 18 line 40); U.S. Pat. No. 6,770,266 (see e.g. column 2, line 9 through column 6, line 35), U.S. Pat. No. 6,746,679 (see e.g., column 1, line 13 through column 11, line 18); U.S. Pat. No. 5,668,934 (see e.g., column 1, line 33 through column 16, line 10); U.S. Pat. No. 7,601,002 (see e.g., column 1, line 11 through column 16, line 8); US Patent Application Publication Nos. 2008/0063612 (see e.g., paragraphs 11 through 165); 2005/0214720 (see e.g., paragraphs 10 through 102); and 2004/0185013 (see e.g., paragraphs 3 through 150); each incorporated herein by reference. Any of the treatment fluids may be a liquid that flows under gravitational forces, or a gel that does not flow under gravitation forces. The treatment fluid preferably can be pumped and/or flows under a vacuum. Preferably any treatment fluid that may be damaging to soft tissue of the oral cavity (e.g., gums or other soft tissues) is in the form of a sufficiently high viscosity fluid or gel so that the fluid does not flow out of the sealed compartment surrounding the teeth being treated. For example, such treatment fluid may have a viscosity of about 0.1 Pa·s or more, about 1.0 Pa·s or more, about 10.0 Pa·s or more, about 100 Pa·s or more, or about 1000 Pa·s or more.

One or more of the treatment fluids may be heated for decreasing the viscosity, for increasing the reactivity, or both. For example, increasing the temperature of the treatment fluid, such as a whitening agent (hereinafter referred to as gel, although high viscosity fluids may be employed according to the teachings herein) may increases the rate of peroxide decomposition to create oxygen free radicals from the gel and so may increase the resultant whitening effect in the enamel surfaces of the teeth. Of course, other treatment materials may be used, including water, salt, gasses, chemical and/or biological medicament solutions, or other materials, compounds etc. Each treatment cavity (e.g., arch-shaped treatment cavity) of the dental covering layer may contain one or more inlet holes) for the delivery of treatment materials into each treatment cavity, as well as outlet (i.e., drainage) holes (e.g. one or more outlet holes on each of the right and left sides of the treatment cavity arch shaped cavity, for the removal of treatment materials from each dental arch treatment cavity.

The components, devices, systems and methods according to the teachings herein may advantageously be employed in various dental treatments, such as an accelerated whitening treatment, tarter removal treatment, gum treatments etc. By employing treatment fluids both in low-volume and high-volume quantities (e.g., a whitening fluid, such as a whitening gel, medications, treatment materials etc.) having a high temperature, having a high concentration of active ingredient, or both, the efficiency of treatment may be increased so that the treatment is accelerated and/or enhanced. It will be appreciated that the whitening treatment, for example, may be achieved without the need for photodynamic therapy. An accelerated dental treatment may be accomplished by heating the dental treatment fluid. Although room temperature treatment may be employed, some or all of the treatment fluid preferably is heated to a temperature of about 27° C. or more, more preferably about 30° C. or more, even more preferably about 34° C. or more, even more preferably about 38° C. or more, even more preferably about 48° C. or more and most preferably about 56° C. or more. Of course, higher or lower temperatures may be used as may be necessary. The treatment fluid in the treatment zones (i.e., in the sealed treatment cavity formed by the dental cover layer) may have a generally uniform temperature or may have varying temperatures. It will be appreciated that similar increases in treatment rates may be achieved using higher concentration of active ingredient in the treatment fluid.

The dental cover layer(s) preferably has a circumferential peripheral roll border rim formed of a sufficiently soft material and arranged so that the roll border rim will compress and deforms to fit snugly against the sides of the gum ridges of the upper and lower jaws. The roll border rims may thus create a sealed cavity (e.g., formed from the cavity well of the dental cover layer) with the erupted crowns of the teeth and surrounding gums contained within the cavity.

The improved mouthpiece of the present invention may incorporate one or more air breathing vents. Preferably, the breathing vents are designed to penetrate through a treatment supply layer of the mouthpiece without compromising the ability of this treatment supply layer to flow one or more treatment materials into the treatment cavity wells (e.g., arch-shaped cavity wells) of the dental cover layers, without compromising the ability of this treatment supply layer to drain one or more treatment fluids from the dental cover layer, or both. For example, the breathing vents may be integrated into a treatment supply layer in a manner that allows for flow of one or more treatment fluids into and out of the mouthpiece.

The sealing roll border rims, preferably made of a soft deformable material, may have a generally rounded shape, such as a shape that forms a highly deformable apron so that when a vacuum force is applied to the inside of the mouthpiece acts to collapse these roll borders onto the gum ridges and fluidly seal the mouthpiece device (e.g., the dental cover layer) of the present invention to the gum ridges. The sealing preferably may be partially or entirely accomplished by a patient biting down onto the mouthpiece. The sealing rims may effectively seal the treatment cavity well of the dental cover layer so that the treatment materials (i.e., the treatment fluids) delivered to the mouthpiece are prevented from leaking into the oral cavity. The sealing may be partially or entirely accomplished by the application of a vacuum. For example, when a vacuum is applied, the sealing roll border rims may be readily collapsed and sucked up against the side walls of the gum ridges. A treatment fluid that is pumped into a fluid sealed treatment cavity well of a dental cover layer preferably contacts the respective teeth on the front surface, the top surface, the back surface, or any combination thereof. More preferably, the treatment fluid contacts the teeth on the front and back surfaces. Even more preferably, the treatment fluid contacts the teeth on all of the exposed surfaces of the teeth. The sealing effect of the highly deformable apron and/or sealing roll border rim/s may be accomplished or enhanced by the ability of the treatment system to remove (e.g., suck out) the air within the mouthpiece utilizing an external pump in order to achieve a vacuum fluid seal of the mouthpiece to the upper and/or lower gum ridges of the upper and/or lower jaws.

Due to the fact that there is great variation in the length of the dental arches between individuals, it may be difficult or even impossible to effectively use a generic stock dental arch to seal the rear-most region of the well of the dental cover layer. For example, it may be difficult or impossible to effectively seal the areas corresponding to the terminal right and/or left tooth in any given dental arch. Without a sufficient seal in these areas, the treatment fluid may undesirably leak out of one or more sides (i.e., the right side, the left side or both) of one or both of the upper or lower arch well through these large unsealed openings. Such unsealed openings (i.e., unsealed regions) may also prevent the creating and/or maintaining of a vacuum seal of the dental treatment cavity wells without providing for some means to seal off these open areas. Forming a vacuum seal between a dental cover layer and a retro-molar pad may face hurdles such as having to select or prepare a dental cover layer of sufficient length and possible contact of the soft tissue of the retro-molar pad with a treatment fluid. To overcome these obstacles, the vacuum seal in the rear of the dental cover layer preferably is made with a molar on each side of the dental arch. Although, this may limit the ability to provide a dental treatment to one or more molars, the aforementioned benefits generally outweigh this concern. Nevertheless, the need to form a sufficient seal (e.g., for maintaining a vacuum) may present particular challenges when sealing over a molar. Surprisingly a sufficient seal has been achieved using a unique distal plug feature incorporated into the rear areas of the treatment cavity wells.

To prevent such leakage of the treatment material and to allow for the ability to create and maintain a continuous or selectively sustained vacuum in the mouthpiece, various teachings of the present invention may incorporate one or more distal plug features (i.e., distal sealing plugs). The term "selectively sustained vacuum" may refer to the ability of a user or practitioner to determine how long to maintain the vacuum, initiate and release vacuums multiple times in a treatment etc. Preferably distal plugs are employed at both ends (right and left) of each dental cover layer. The distal plugs may be designed to cover the rear portions of the treatment cavity well of the dental cover layer. Preferably, the distal plugs effectively seal these openings. For example, the distal plugs may seal the openings when the patient bites down onto the mouthpiece. In some embodiments, distal plugs of various sizes (e.g., heights and lengths) may be integrated into the design of the mouthpiece.

Each dental arch mouthpiece device includes one or more treatment supply layers. The treatment supply layer may provide one or more treatment fluids to a dental cover layer, may provide heat to a dental cover layer, or both. If the mouthpiece includes two dental cover layers, each dental cover layer may have a separate treatment supply layer, or a single treatment supply layer may be employed for both dental cover layers. For example, a single treatment supply layer may be positioned between two dental cover layers. The treatment supply layer may contain built-in flow channels or tubes capable of flowing one or more treatment fluids. The flow channel or tubes of treatment supply layer preferably course throughout this layer of the mouthpiece. The treatment supply layer preferably has one or more (e.g., two or more) inlet holes for delivering a fluid to a well (e.g., sealed cavity) of a dental cover layer. The treatment supply layer preferably has one or more (e.g., two or more) outlet holes for removing a fluid from a well (e.g., sealed cavity) of a dental cover layer. It will be appreciated that flow directions may be changed so that an outlet hole can function as an inlet hole, so that an inlet hole can function as an outlet hole or both. A treatment supply layer that services upper and lower dental cover layers may have (1) one or more holes (e.g., inlet and outlet holes) in the floor of the treatment supply layer for providing a fluid communication with the treatment cavity or well of the dental cover layer of the lower teeth and surrounding gums; and (2) one or more holes (e.g., inlet and outlet holes) in the ceiling of the treatment supply layer for providing a fluid communication with the dental cover layer over the upper teeth and surrounding gums. The flow channels or tubes preferably transport and substantially evenly distributes one or more treatment fluids to the dental cover layer. The treatment fluid may be any art known treatment fluids, such as described herein. For example, the treatment fluid may include a whitening material (such as a gel material), water, air, medicinal materials, therapeutic materials, cleansing materials, rinsing materials, or any combination thereof. The treatment supply layer may deliver one or any combination of the treatment fluids into the treatment cavity wells (e.g., the dental arch wells) of the dental cover layer. As such, the treatment supply layer may effectively bathe one or more (e.g., all of the surfaces of the teeth and surrounding gums in the well and covered by dental cover layer(s) with the whitening gel or other treatment materials. Preferably the channels or tubes are capable of delivering and/or removing a plurality of treatment fluids, such as water or air.

The treatment supply layer of the mouthpiece may include a cavity or port for the insertion of a heating module unit for the controlled heating of treatment fluids flowed through the heating module unit and then into the treatment cavities of the mouthpiece. The treatment supply layer may be integrated into a coupling component of the mouthpiece to allow for the secure insertion of the heating module unit into the coupler and the secure fluid connection of the coupler containing a segment of the treatment supply layer of the mouthpiece to the heating module unit.

The soft body of the cover layers of the mouthpiece may be very soft (e.g., VLRH—very low rubber hardness) to promote patient comfort and wear on insertion in the oral cavity. The soft body of the cover layers of the mouthpiece may be very soft so as to promote their easy collapse and closely adapted conformation to the side walls of the gum ridges so as to expand the number of patients with varying gum ridge anatomy that the mouthpiece roll border rims can be sucked onto to achieve good vacuum fluid seal of the mouthpiece to the gum ridges as well as enhancing the ability to achieve an acceptable level and maintenance of good vacuum fluid seal throughout the treatment even when positive pressure is applied inside the treatment cavities when flowing in treatment materials inside the cover layer treatment cavities.

The soft body may be made from silicone materials or thermoplastic elastomer materials or other elastomeric materials of very low shore hardness.

Rigid stiffening elements on both the buccal and lingual/palatal aspects of the covers may be incorporated in some embodiments of the mouthpiece. These rigid elements are designed to resist the collapse of the specific areas of the covers (when a vacuum force is applied to the inside treatment cavities of said covers) to which they are attached (externally as an "exoskeleton") to create cover layers (a soft body) that is/are differentially collapsible/conformable to the gum ridge or ridges they cover when inserted into the mouth. This allows for the cover layers to intimately adapt (by readily collapsing and being sucked onto) to the gum ridges at their peripheral roll border rims or apron segments and provide a good vacuum fluid seal of the covers to the sides of the upper and or lower gum ridges whilst those areas of the covers (soft body of the device) to which the rigid stiffening members are attached to resist collapse and maintain a negative space between the teeth and surrounding gums covered by the fluid sealed soft body of the cover layers.

This design of the mouthpiece device of the present invention may allow for significant volumes of treatment materials to be flowed inside the treatment cavities of the soft body of the cover layers (both on the buccal and lingual/palatal aspects of the soft body cover layers) and remain present on the surfaces of the teeth and our surrounding gums covered by cover layers and contained within the treatment cavities when a vacuum force is applied and maintained to the mouthpiece.

The design of the mouthpiece may further allow for treatment material to be flowed into the mouthpiece treatment cavities under positive pressure while maintaining both a fluid seal around the peripheral roll borders of the mouthpiece to the gum ridges and maintaining a robust negative space for the treatment fluids to fully cover the teeth and or surrounding gums throughout the treatment. Alternatively, these rigid stiffening elements may be partially or fully embedded inside the cover layers (as an "endo-skeleton").

Embodiments of the mouthpiece may incorporate upper and or lower "bite plates" inserted into or embedded into the upper floor and lower ceiling of the soft body cover layers of the upper and lower treatment cavities respectively of the mouthpiece. These may incorporate positioning depressions or ridges to optimally position the teeth and gum ridges inside the mouthpiece and may also helpful in preventing the patient from biting down too hard and collapsing and thereby compromising the internal vacuum tube supply layer's lumen integrity and ability to achieve and maintain vacuum.

Embodiments of the mouthpiece may also incorporate a rigid mouthpiece coupler component that fluidly connects to the soft body cover layers and supply layer/s. This rigid mouthpiece coupler may further allow for its fluid connection to a heating module unit that itself is fluidly connected via a set of tubing to the control unit and a treatment container (or disposable treatment cartridge) that may be inserted into the control unit. The treatment container or disposable cartridge is itself fluidly connected to the tubing and through it to the heating module unit and the connected mouthpiece device of the present invention.

The mouthpiece coupler is some embodiments may incorporate rigid vacuum tube extensions (right and left sides) that insert into the vacuum tubes of the supply layer (built into the soft body of the mouthpiece) so as to protect the lumen integrity of the vacuum tube line when the mouthpiece is inserted into the mouth and the patient closes his upper and lower jaws to insert the upper and lower dentulous or partially dentulous upper and lower gum ridges into the upper and lower cover layer treatment cavity wells.

The mouthpiece coupler may incorporate in some embodiments a rigid vacuum tube which fluidly connects to the heating module unit and connected control unit tubing (that itself is connected to a vacuum pump/s and a flow control mechanism inside the control unit. This specific vacuum tube may incorporate in some embodiments a deformable o ring feature to enhance the fluid sealing of the mouthpiece coupler to the heating module unit and vacuum tubing line of the control unit.

The components, devices, systems, and process according to the teachings herein may be employed in a dental treatment for providing a treatment to one or more teeth, for providing a treatment to the gums, or both. These components, devices, systems, and processes may find application in teeth whitening; antibiotic treatment, antimicrobial treatment, fluoride treatment, or any combination thereof. It will be appreciated that other applications in the field of dentistry may find use of the features according to the teachings herein. The dental treatment may be a generally short treatment, such as for about 10 minutes or less, or may be a generally long treatment, such as for greater than 10 minutes, preferably about 20 minutes or more, more preferably about 30 minutes or more. It will be appreciated that the duration of the dental treatment will typically be about 3 hours or less, more preferably about 2 hours or less, and most preferably about 1 hours or less. Dental treatments of duration greater than 3 hours are also anticipated (e.g., from about 3 hours to about 8 hours, such as during the night sleep hours). A vacuum may be applied to the dental cover layer for a substantial portion (e.g., at least 50% of the duration, at least 70% of the duration, at least 80% of the duration, or at least 90% of the duration) of the treatment time. The dental cover component surprisingly can maintain a vacuum for such long durations even when the dental cover component is a stock generic cover (i.e., not a custom-made cover).

As mentioned above, according to some embodiments, a dental treatment system may include a pumping component for pumping one or more treatment fluids. For example, the pumping component may be in fluid communication with a mouthpiece according to the teachings herein. Preferably the pumping component is in fluid communication with the treatment supply layer of the mouthpiece. The system may include a control unit for controlling the pumping component. A pumping component may be incorporating into the housing of an external control unit or may be a separate element. The pumping component may incorporate a set of pistons that can compress a collapsible accordion style disposable cartridge or other type of cartridge inserted into the control unit and deliver a controlled volume and flow rate of the treatment materials via the control unit tubing to the connected heating module unit for controlled heating and delivery of the treatment material via the mouthpiece coupler and supply layer of the mouthpiece to the mouthpiece treatment cavities. For example, a control unit including a microprocessor may monitor and/or control the temperature of a treatment fluid. The control of the temperature preferably employs a feedback loop. Using the temperature control, the temperature of a treatment fluid being delivered to the mouthpiece may be controlled. A connected heating module unit may advantageously enable a practitioner to utilize a whitening fluid (e.g., a whitening gel) immediately from storage, and thus eliminate the need for a step of defrosting the whitening fluid, a step of warming the whitening fluid, a step of preparing the whitening fluid for usage in a dental treatment, or any combination thereof. As such, the dental treatment processes according to the teachings herein may be free of combination or all of the aforementioned step. By allowing for the heating of the whitening fluid/gel it is possible to significantly enhance the chemical activity and whitening capacity of the whitening fluid/gel.

The in-flow of the treatment material may allow for the treatment fluid/gel to circulate in the mouthpiece device of the present invention. This flow can be continuous or sporadic (e.g., pulsed or intermittent). For example, when whitening fluid is flowing in a turbulent manner within the sealed treatment cavity formed by the dental cover layer, so that the amount of chemically active treatment fluid that contacts the enamel surfaces of the teeth is greatly increased compared with the case where the treatment fluid is delivered into the mouthpiece and remained statically in place during the whitening treatment. This convection type flow of the treatment fluid around all the enamel surfaces of the teeth increases the whitening potential of a fixed volume of treatment fluid that is delivered to the mouthpiece. This is exactly analogous to the higher heat flux when heating foods in a convection oven. For example, by flowing treatment fluid contained in the mouthpiece device around the teeth in a turbulent manner (just as hot air flows in a convection oven), the system increases significantly the volume of chemically active whitening fluid, delivered to the mouthpiece, that can come in contact with all the enamel surfaces of the teeth. Increased volume of chemically active whitening fluid in contact with all enamel surfaces of the teeth results in significantly increased whitening effect of the fluid into all these enamel surfaces of the teeth.

As mentioned above, the flow of the treatment fluid may employ a pump component, such as pump component controlled by a microprocessor, in a sporadic or pulsing manner for a given interval of time. This may allow for alternate static or convection flow of the treatment materials (around the teeth) for set periods of time in the mouthpiece device.

The systems and methods may employ one or more pressure sensors for measuring a pressure in a tube, for measuring a pressure in a sealed cavity, for measuring a pressure in a layer of the mouthpiece (e.g., the treatment supply layer, and/or the dental cover layer), or any combination thereof. The pressure sensor(s) may be incorporated into the control unit and or the heating module unit fluidly connected to the mouthpiece. Pressure sensor(s) may monitor, for example, the degree of vacuum in the mouthpiece, one or more flow rates, the total amount of treatment materials delivered into, or alternately, removed from the mouthpiece device by the pump, or any combination thereof. A sensor may also monitor the flow rate of a treatment fluid during a "closed-circuit" treatment cycle. In some embodiments a magnet may be used to verify proper closure of a handle/coupling mechanism (incorporated into the mouthpiece coupler) of the mouthpiece coupler and the attached heating module unit and control unit tubing set. For example, the heating module unit may include an electromagnetic sensor to determine when the parts (e.g. heating module unit and mouthpiece coupler component) are properly connected, or not.

By maintaining a vacuum seal of the dental cover layer of the dental mouthpiece to the gum ridges, the peroxidase enzymes naturally found in saliva are substantially or even entirely prevented from seeping into or otherwise penetrating the sealed cavity. This novel vacuum sealing feature of the present invention may effectively protect the chemically active treatment fluids, such as whitening gel, from being chemically deactivated by the salivary enzyme peroxidase. As the treatment fluid's chemical oxidative potential is never substantially compromised by the saliva, the whitening result of the present invention is enhanced. Additionally, as saliva is always present in the mouth, the effective vacuum fluid seal of the mouthpiece to the gum ridges reduces or entirely prevents saliva from entering into the treatment cavities and diluting the concentration of the treatment materials thereby enhancing the efficacy of the undiluted treatment material whilst it remains in the treatment cavities and in contact with the target tissue (hard or soft or both).

It will further be appreciated that a pumping component may allow for continuous flow of a treatment fluid into and out of the mouthpiece throughout the treatment. As such, fresh new fluid having full chemically activity may be delivered and applied to some or all the enamel surfaces of the teeth contained within the dental cover layer throughout the treatment. When employed in a whitening treatment, this may significantly increase the whitening result that can be obtained in a set period of time of the present invention compared to a static one-time delivery of treatment materials as is the case in known tooth whitening procedures.

According to some embodiments, flexible tubes may be connected to the pumping component from the fresh and spent treatment fluid containers and a separate set of flexible tubes connected to the pumping component which in turn also connect to separate inflow and outflow tubes integrated into the front of the mouthpiece. These inflow and outflow tubes may be further integrated to fluidly connect with a heating module unit which is in turn fluidly connected to an integral handle design (mouthpiece coupler) of the mouthpiece device.

The set of tubes from the pump assembly of the control unit to the mouthpiece device may be clipped via a clasping device or small harness to the patient's clothing, patient dental apron, or some element of a dental chair or other fixing point so that any drag they create on the mouthpiece is reduced or eliminated, so that the tube or set of tubes are neatly organized, or both.

The tubes may consist of a multi-lumen segmented tube containing separate tube lines for treatment material in-flow, vacuum line tube used for initiating and maintaining vacuum in the mouthpiece and for sucking out spent treatment material from the mouthpiece to a waste container in the control unit, separate tubing for flowing water either from a water reservoir in the control unit or from the water line of a dental chair unit or other accessible water source, an air intake line for flowing air into the mouthpiece, a power cable, and sensor and lighting cables.

Another aspect of the invention is directed at a separate disposable elastomeric gum protector component, in cases where the gums require additional protection from treatment materials. The gum protector component may be used with a dental treatment fluid and the mouthpiece of the present invention. The gum protector component may be employed in a process of treating teeth with one or more fluids/gels for whitening teeth. The gum protector component may provide a sufficient barrier for the gums so that highly active treatment fluids may be employed. The gum protector component may be designed for insertion onto each separately of the gum ridge(s) of the upper jaw, the lower jaw, or both. The gum protector component preferably is inserted into the oral cavity prior to the insertion of the mouthpiece into the oral cavity when using treatment materials that could damage the gum tissue. For example, the gum protectors/guards may act to isolate both the maxillary and mandibular gum tissues that are covered by the mouthpiece from even highly concentrated hydrogen peroxide whitening gels that will be delivered into the treatment cavity well(s) of the cover layers of the mouthpiece device, or other potentially harmful treatment materials. The gum protector component may sufficiently cover and fluidly seal the gums whilst leaving the erupted teeth substantially exposed so peroxide having a concentration of about 15% or more, about 25% or more, about 35% or more, or about 45% or more can be used to whiten the teeth without harming the gum tissue exposed inside the mouthpiece treatment cavities.

The gum protector component may be provided as a kit including a plurality of different size gum protector components. The gum protector component may be sufficiently pliable so that only a few different sized stock generic gum protector components are required to treat the majority of patients. For example, the kit may include gum protector components having about 2 or more different stock generic sizes, preferably about 3 or more different sizes, and more preferably about 4 or more different sizes. The number of different stock generic sizes preferably is about 10 or less. The disposable gum guard also may come with different sized tooth holes or a variable number of tooth holes (e.g. patients who have had all four bicuspids extracted as part of their orthodontic treatment).

The separate and disposable gum protector (i.e., gum protector component, or gum guard component) in one of its embodiments may be comprised of a stretchable polymeric material. Preferred polymeric materials have an elongation at break of about 100% or more, more preferably about 200% or more, and most preferably about 300% or more. Preferred polymeric materials have a sufficiently low tension set so that the material recovers its initial shape after being stretched. For example, the tension set (measured at room temperature, 10 minutes after stretching the material by 200%) may be about 10% or less, preferably about 7% or less, more preferably about 5% or less, and most preferably about 3% or less. The polymeric material may have a carbon containing backbone or a silicon containing backbone. The polymeric material may be an elastomer. Examples of elastomers that may be employed include silicone elastomers and specifically liquid silicone rubber (LSR) or high consistency rubber (HCR) silicones, natural rubber/latex materials, poly-isoprene, styrene butadiene rubber; SEBS rubbers, or any combination thereof. The gum protector component may have a chemical coating or layer that has been applied and fixed to one or more of its surfaces. For example, a layer may be applied to the inner (proximal) surfaces of the gum protector component, so that the layer is in contact with the gum tissues. The material preferably combines the mechanical properties of high tear strength with low modulus of Young (low recoil force).

Each of the silicone and or rubber body of the gum protector/guards may be shaped to mirror the horse-shoe arch shape and three-dimensional ridge form of the gum ridges of each of the upper and lower jaws so as to adapt quite closely to these oral structures.

The body of the gum protector/guard component may be further modified to allow for multiple cut-outs of varying diameters and varying spacing between them (fully cut out or perforated for selective removal) along the section of said guard which mirrors the location of the center ridge lines of the gum ridges and the teeth of the upper and lower jaws. These cut-outs may mirror or conform in their shape to the scalloped form/shape of the gum-line (inter-dental papilla) of the teeth to be treated.

The body of the gum guards may incorporate inside them multiple hollow tunnels on both their buccal and lingual/palatal aspects that may be pre-filled with various light curable polymer resin materials.

The inner coating of the gum protector/guard component (facing the gum ridges), as noted above may contain various chemical compounds such as a sugar-based gel or spray-on self-adhering coating whose purpose is to provide a chemical neutralization of the active treatment materials, for example peroxide based whitening gel, and so act as a chemical barrier to further protect the gum tissues from the treatment materials. As mentioned above, the gum protector/guard may provide an effective barrier to protect the gums tissues from even very high concentrations of treatment materials, such as, for example, hydrogen peroxide whitening gels of 35% or even higher.

The optionally disposable gum protector/guard component described above may provide a flexible yet snugly fitting barrier to the gums and alveolar gum ridges that can be placed over the teeth and gums to be treated. When positioned in a dental arch in the mouth, the crowns of the teeth may protrude out of the gum protector component while covering the gums. This fitted barrier (the disposable gum protector/guard component) is further shaped to also allow for a good fit and seal of the single or double dental arch mouthpiece device's deformable peripheral roll border rims (especially when a vacuum force is applied to the mouthpiece) to the both the upper and lower gum protector/guards. This allows for a good seal of the treatment fluid that is delivered into the mouthpiece device and prevents leakage of the treatment materials from between the mouthpiece device and its fluid sealed adherence to the underlying gum guard from the oral cavity (while the gum guard protects the gums).

When the gum protector component is used with a dental treatment layer, the seal of the space around a row of teeth may be further enhanced by the unique deformable flap apron design and peripheral border roll rims of the dental cover layer/s of the mouthpiece. This seal in conjunction with the unique distal sealing plugs, may enhance the ability of the pump to suck out the air from the mouthpiece and create an effective vacuum fluid seal of the dental cover layer/s to the outer side wall surfaces of the previously placed gum protector components. It will be appreciated that an upper and a lower gum protector component may be employed for protecting each of the upper and lower jaw's gum ridges.

This configuration and relation of these components to each other in the oral cavity effectively and safely isolates the various concentrations of whitening agents applied to the teeth from the soft tissues (gums, tongue, cheeks, palate, oral mucosa) and so may protect these soft tissues from the caustic effects of even highly concentrated formulations of these chemical agents during the improved whitening treatment of the present invention.

Embodiments of the disposable gum protector/guard component allow for adaptation by the dental practitioner of its shape to further adapt the inner edges of the multiple teeth cut-outs to the scalloped gum-line of any particular patient. Multiple internal channels pre-filled with various light curable resins or auto-polymerizing resins and located one either the buccal and or lingual/aspects of the drape may be incorporated in certain preferred embodiments of the gum guard drape.

When inserted and placed onto the gum ridge (by inserting the cut out teeth holes through the anatomical crown portions of the teeth) the gum guard drape can be snugly adapted to the patient's particular gum ridge anatomy by pressing and molding the drape to the underlying ridge on both its buccal and palatal/lingual aspects and polymerizing and curing the light curing material contained within the channels on these respective aspects of the drape so as to more intimately conform the drape to the particular ridge it covers.

Additionally, the drape's channels pre-filled with light curable resin materials may extend when inserted onto the ridge into the natural anatomical undercuts of the ridge (e.g. the muco-buccal as an example). When the drape is stretched pressed into these natural undercuts of the gum ridge and the resin is cured in situ to create an anchoring of the new position of the drape. The borders of the individual teeth holes may therefore be stretched as well (as they are all part of the drape structure) by stretching the drape into the undercuts of the gum ridge and each of the tooth hole borders can therefore be adjusted to a new position determined by the operator and "frozen" by the operator to more closely adapt on a tooth by tooth basis to the particular gum line of the patient. This is an advantage when whitening the teeth as it allows for full exposure of the enamel surfaces of the teeth right to the gum while effectively protecting the gums of the gum ridge that are contained within the mouthpiece and exposed to high concentration peroxide treatment gels.

As mentioned above, other embodiments of the disposable gum protector may also include an inner coating which is self-adhering coating when placed in contact the gum tissues. These coatings may include various medicaments or chemical compounds for therapeutic delivery of these various medicaments or compounds to the gum tissues. Further embodiments of the disposable gum protector/guard have wider dental and medical applications wherever what is known in the dental field as a "dry field" is required or advantageous for a given medical/dental procedure. Said gum protector/guard can be utilized in many dental procedures as a replacement for what is commonly known in the dental field as rubber dam. It can also be used to create an effective barrier against saliva dilution or "washout" of medicaments or other treatment materials placed on the gum tissue or syringed into the gum "pockets" (sulcus) and then covered by the gum drape.

The gum guard drape can be made of elastomeric materials that are fluid impermeable yet gas permeable to allow for their placement for extended periods of time on the gum ridges. This allows for an extended exposure time for the medicaments or treatment materials on or in the gum tissue without any dilution of said materials or medicaments whilst allowing the gum tissue covered by the gum drape to "breathe" the entire time the drape is applied.

Additionally, as the disposable gum protector/guard component is not integral to the appliance, it may be provided in several stock sizes to match a given stock sized mouthpiece device and so provide, without the need to customize the mouthpiece or gum protector guard for each patient, an effective isolation of the gums and other soft tissues of the mouth from even highly concentrated formulations of treatment materials without the need to manually apply a hardening foam material as is in common use in the current professionally administered power whitening procedures.

As mentioned above, the disposable gum protector/guard may be a component which is itself a stock item fabricated in various stock sizes, or alternatively, it may be fabricated as a custom-made device for each patient using molding and die techniques known in the field.

In accordance with some embodiments, an optional tooth shade matching sensor unit may be incorporated into the control unit, which may be used to record pre- and/or post-treatment tooth shade values.

Another aspect of the invention is directed at a kit including a plurality of mouthpieces, such as a plurality of mouthpieces according to the teachings herein. The kit preferably includes stock generic (i.e., not custom made) mouthpieces and includes mouthpieces having different sizes. The kit may include mouthpieces having different widths for matching with mouths having different widths of the dental arch (e.g., as measured between corresponding left and right molars). The kit may include mouthpieces having different length of arches. It will be appreciated according to the teachings herein that the use of distal sealing plugs may reduce or eliminate the need for mouthpieces having different lengths. By employing a kit of stock generic mouthpieces, the need for custom production of a mouthpiece (e.g., using a dental mold impression) may be eliminated. The kit may include pre-assembled mouthpieces or may include stock generic dental cover layers, such as the dental cover layers according to the teachings herein. The kit may include dental cover layers suitable for lower dental arches, suitable for upper dental arches, or both. The kit preferably includes dental cover layers having different widths use in individuals having dental arches with different widths. The kit may include one or more treatment supply layers, such as a treatment supply layer according to the teachings herein. The treatment supply layer may be suitable for connecting with one or two dental cover layers. The need for dental cover layers having different lengths may be reduced or eliminated by employing distal sealing plugs in the dental cover layer suitable for sealing the rear ends of the dental arch. Preferred kits include mouthpieces and/or dental cover layers having two or more different stock generic sizes, more preferably three or more different stock generic sizes, and most preferably four or more different stock generic sizes. The number of different sizes may be generally large, but preferably is about 20 or more, more preferably about 10 or less, and most preferably about 6 or less or even 4 or less.

In a further embodiment, a method for executing a tooth whitening treatment is provided, wherein one or more of the following steps may be executed: configuring a procedure for simultaneous customized tooth whitening; setting up a pump module to connect to a mouthpiece designed for a teeth whitening treatment; configuring treatment settings on a control device coupled to the pump module; positioning the mouthpiece in a patient's mouth; applying a flow control to cause a vacuum between the mouthpiece and the patient's gum ridge anatomy; applying flow control to automatically manage delivery of materials in accordance with the treatment settings; and using flow control to remove treatment materials from the mouthpiece. Of course, other steps or combinations of steps may be used. For example, prior to a treatment, the baseline shades of the respective teeth may be measured, to enable customized treatment of the respective teeth. In some cases, a gum guard may be used in addition to the mouthpiece and placed on the gum ridges prior to the insertion of the mouthpiece into the mouth, which may be a customized or stock type of guard. In additional cases, treatment materials may be heated as may be necessary during treatments.

Reference is now made to the respective figures, which describe elements or aspects of multiple embodiments of the present invention. The drawings are provided for illustrative purposes only and are not meant to be limiting.

FIG. 1a is a side view of one embodiment of the mouthpiece 1 of the present invention comprised of four main components; namely a soft body 2, functioning as a mouthpiece to be placed in the mouth to facilitate a dental treatment that is made of elastomeric materials such as silicone or thermoplastic elastomers, and a mouthpiece coupler 3 made of hard plastic materials, functioning as a fluid sealed conduit to transfer treatment materials into the mouthpiece, extract materials from the mouthpiece, act as a handle for the mouthpiece, and function to accept the insertion of treatment material heater (e.g., heating module unit). Also illustrated is a buccal stiffening element 4 and lingual/palatal stiffening element 5, which are hardened exo-skeletal type elements that are designed to act to restrain selected areas of the soft body 2 of the mouthpiece 1, which they are connected to the soft body 2, prevent collapse of the soft body areas they are connected to when a vacuum force is applied to the upper 23 and lower 24 treatment cavities of the mouthpiece 1. These stiffened areas of the soft body, in some embodiments, correspond to the areas of the mouthpiece 1 which cover the upper and lower teeth and surrounding gums contained within the mouthpiece 1. The stiffening of these areas acts to preserve an empty space around the teeth and surrounding gums in both the upper and lower treatment cavities 23 and 24 respectively, when the vacuum force is applied to the mouthpiece 1. The buccal stiffening element 4 provides this stiffening of the soft body on the right and left buccal aspects of the soft body 2, and the stiffening element 5 provides the same stiffening of the soft body on the right and left lingual/palatal aspects of the soft body 2. Further depicted are peripheral buccal upper roll border rims 6, and peripheral palatal roll border rims 7, the upper treatment cavity 23, the coupler heating module vacuum tube 3b for vacuum fluid connection to the heating module unit 30 (not depicted) and the coupler magnet hole 3g.

According to further embodiments, the buccal stiffening element 4 and/or the lingual/palatal stiffening element 5, or other hardening elements, may be endo-skeletal type elements that are embedded inside the soft body 2, and designed to act internally to restrain selected areas of the mouthpiece 1, which they are connected to, to prevent collapse of the soft body areas they are connected to when a vacuum force is applied to the upper 23 and lower 24 treatment cavities of the mouthpiece 1. For example, all endo-skeleton type stiffening elements may be molded and then over-molded with the soft body 2, thereby providing selective or differential collapsibility of the soft body 2 when applying a vacuum to the mouthpiece 1.

Figure 1B:
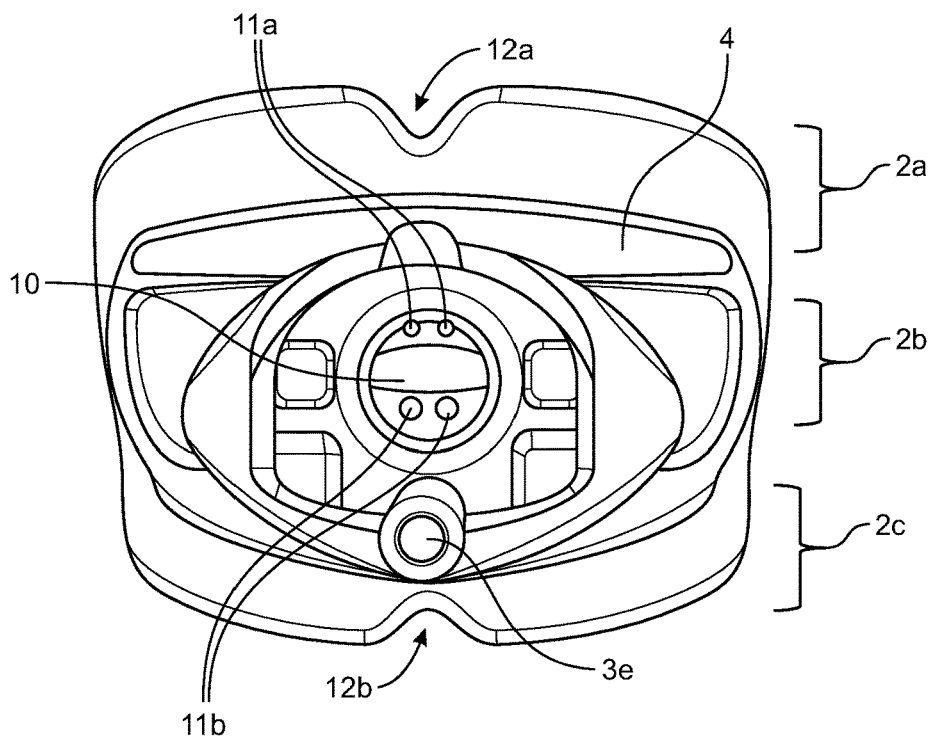
FIG. 1b is a front view of the mouthpiece, according to some embodiments.

FIG. 1b is a front view of the mouthpiece 1 of FIG. 1a wherein are illustrated the soft body upper section 2a, the soft body middle section 2b and the soft body lower section 2c. Also depicted is a buccal stiffening element 4, a treatment material port 10 of the soft body 2, treatment port upper holes 11a and treatment port lower holes 11b which lead the upper 23 and lower 24 treatment cavities respectively, the soft body upper frenum notch 12a, the soft body lower frenum notch 12b, and the coupler heating module vacuum tube hole 3e of the mouthpiece coupler 3.

Figure 2A:
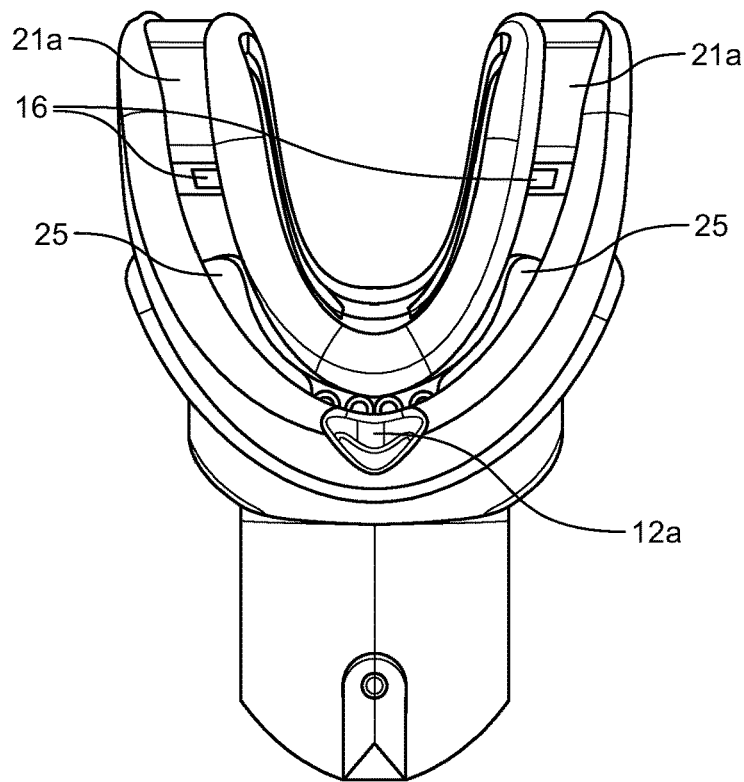
FIG. 2a is a top/front view of FIG. 1a, according to some embodiments.

FIG. 2a is a top/front view of FIG. 1a wherein is depicted the soft body upper frenum notch 12a, parts of the soft body vacuum tube posterior bore hole 16, for collection of treatment related fluids from the upper 23 and/or lower 24 treatment cavities, and which are connected to the soft body vacuum tube 17 located in the middle portion 2b of the mouthpiece 1, to facilitate vacuum and/or drainage functionality to remove treatment related materials from the mouthpiece 1. Also depicted is an upper bite plate 25 and upper soft body rear vacuum plugs 21a, which are located in the upper soft body rear section 2e, which allow for a posterior vacuum fluid seal of the mouthpiece 1 when the patient has closed his upper posterior teeth into them.

Figure 2B:
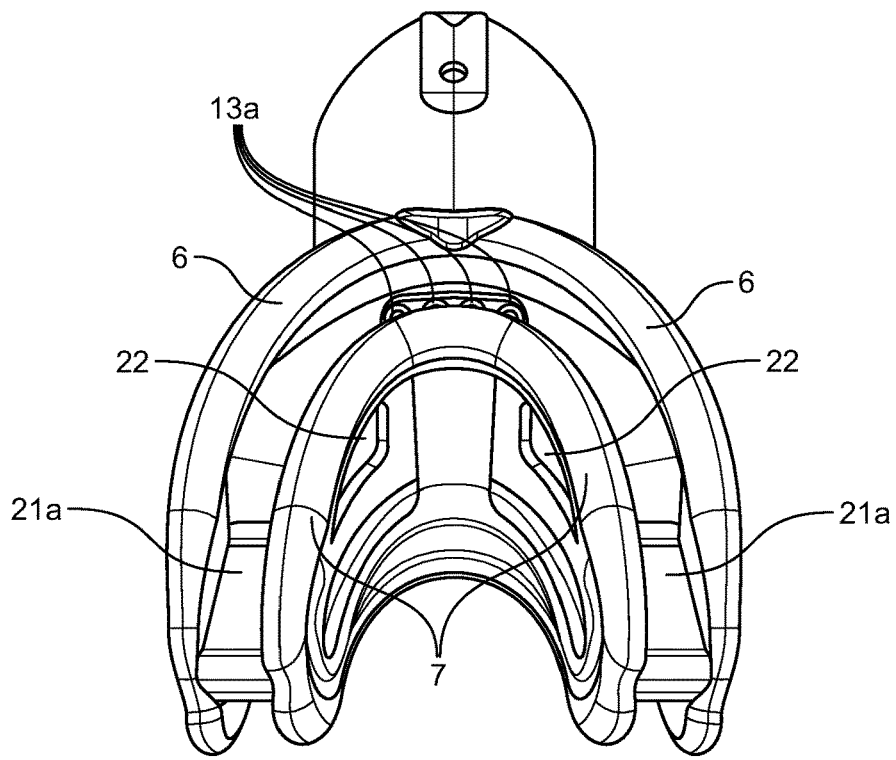
FIG. 2b is a top/rear view of FIG. 1a, according to some embodiments.

FIG. 2b is a top/rear view of FIG. 1a wherein is depicted the buccal upper roll border 6 and palatal roll border 7 of the soft body upper section 2a, as well as embodiments of upper soft body anterior holes 13a for the inflow of treatment materials into the upper treatment cavity 23 on both buccal and palatal sides of the anterior upper teeth when the mouthpiece 1 is inserted into the oral cavity. Also depicted are the upper soft body rear vacuum plugs 21a, and embodiments of the soft body breathing passages 22 which allow the patient to breathe through their mouth whilst the mouthpiece 1 is fully inserted into the oral cavity.

Figure 3A:
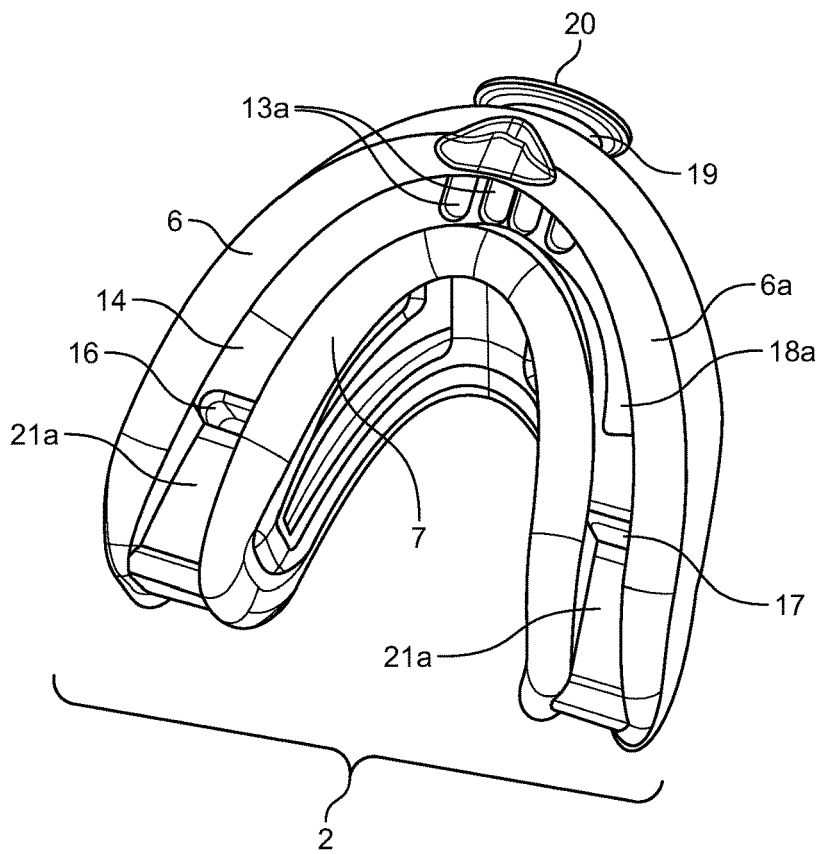
FIG. 3a is a top/rear view of the soft body 2 of FIG. 1a, according to some embodiments.

FIG. 3a is a top/rear view of the soft body 2 of FIG. 1a, wherein are depicted buccal upper roll borders 6 and the palatal roll borders 7 which, when a vacuum force is applied to the upper treatment cavity 23, readily collapse and adapt to the particular anatomical shape of each patient's maxillary gum ridge, to provide a fluid vacuum seal within the upper portion 2a of the mouthpiece 1. Also depicted are embodiments of the buccal upper roll border outer lip 6a, the buccal upper roll border inner lip 6b, the upper soft body anterior holes 13a, the upper treatment cavity floor 14, the soft body vacuum tube posterior bore hole 16, the soft body vacuum tube 17 embedded in the middle portion 2b and runs between the upper floor 14 and lower ceiling 15 of the upper 23 and lower 24 treatment cavities, and the upper soft body rear vacuum plugs 21a. Further depicted are embodiments of the soft body extension ring 19 and the soft body extension ring sealing lip 20.

Figure 3B:
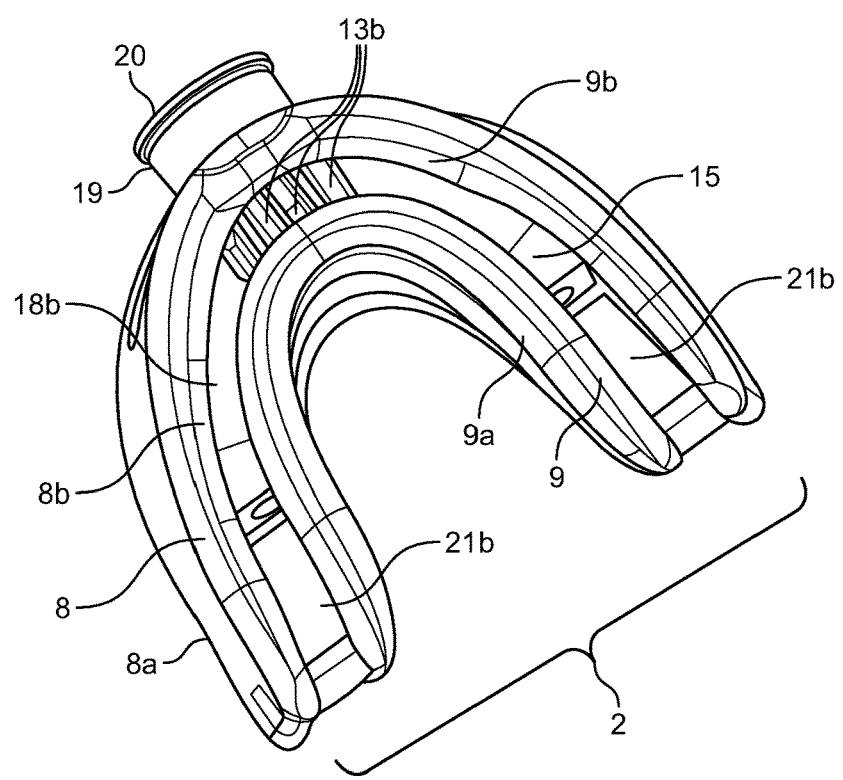
FIG. 3b is a bottom/rear view of the soft body 2 of FIG. 1a, according to some embodiments.

FIG. 3b is a bottom/rear view of the soft body 2 of FIG. 1a, wherein are depicted embodiments of the buccal lower roll borders 8 and the lingual lower roll borders 9 which when a vacuum force is applied to the lower treatment cavity 24 readily collapse and adapt to the particular anatomical shape of each patient's mandibular gum ridge to provide a fluid vacuum seal within lower portion 2c of the mouthpiece 1. Also depicted are embodiments of the buccal lower roll border outer lips 6a, the buccal lower roll border inner lips 6b, the lower soft body anterior holes 13b, the lower treatment cavity floor 15, and the lower soft body rear vacuum plugs 21b located in the lower soft body posterior section 2g which allow for a posterior vacuum fluid seal of the mouthpiece 1, when the patient closes his/her lower posterior teeth into them. Further depicted are embodiments of the soft body extension ring 19 and the soft body extension ring sealing lip 20.

Figure 4A:
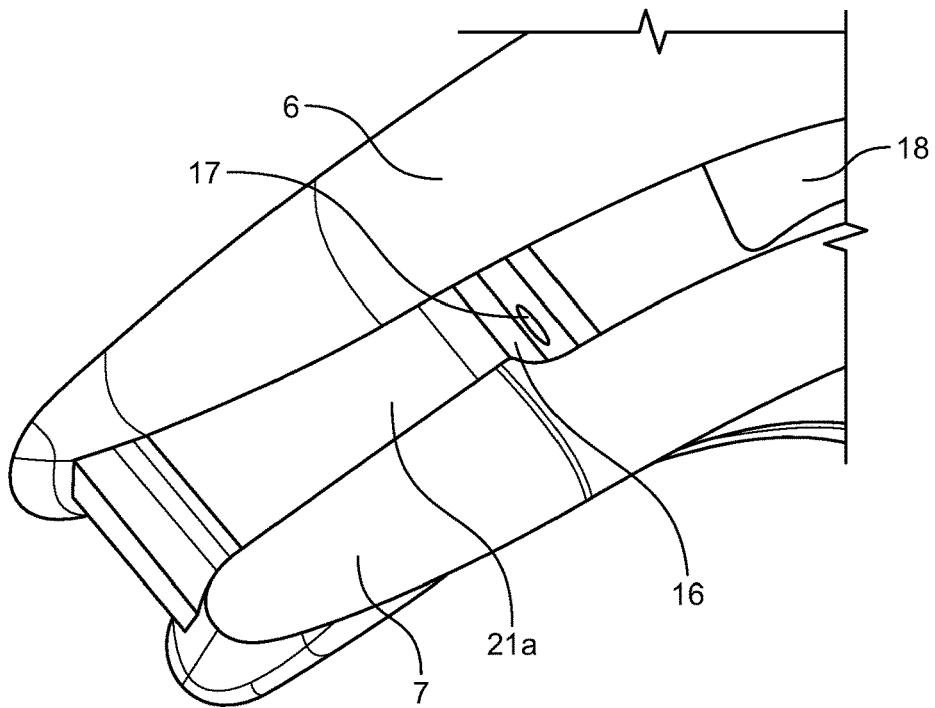
FIG. 4a is a top close-up view of FIG. 1a, according to some embodiments.

FIG. 4a is a top close-up view of FIG. 1a wherein are depicted embodiments of the buccal upper roll border 6, the palatal roll border 7, the soft body vacuum tube posterior bore hole 16 where treatment material that flowed into from both the upper 23 and lower 24 treatment cavities can flow into the soft body posterior vacuum tube port 17. Also depicted is and embodiment of the upper soft body rear vacuum plug 21a.

Figure 4B:
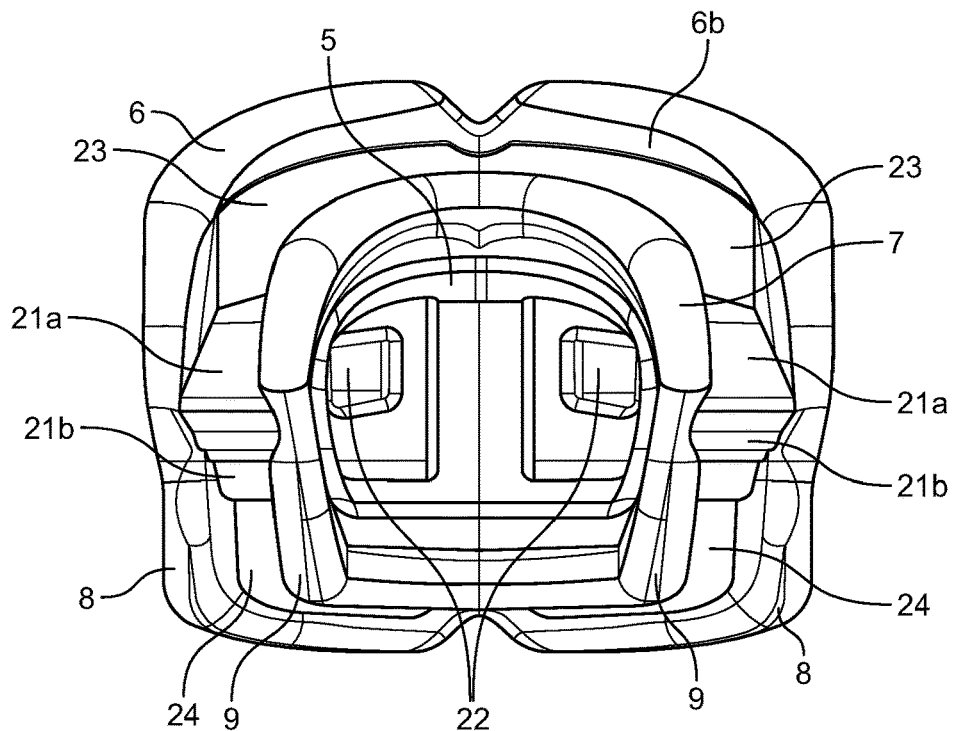
FIG. 4b is a rear view of the mouthpiece 1 of FIG. 1a, according to some embodiments.

FIG. 4b is a rear view of the mouthpiece 1 of FIG. 1a wherein are depicted embodiments of the lingual/palatal stiffening element 5, the buccal upper roll borders 6 and the buccal upper roll border inner lips 6b, the palatal upper roll borders 7, the buccal lower roll borders 8, and the lingual lower roll borders 9. Further depicted are the upper 23 and lower 24 treatment cavities, embodiments of the soft body breathing passages 22, and the upper 21a and lower 21b soft body rear vacuum plugs.

Figure 5A:
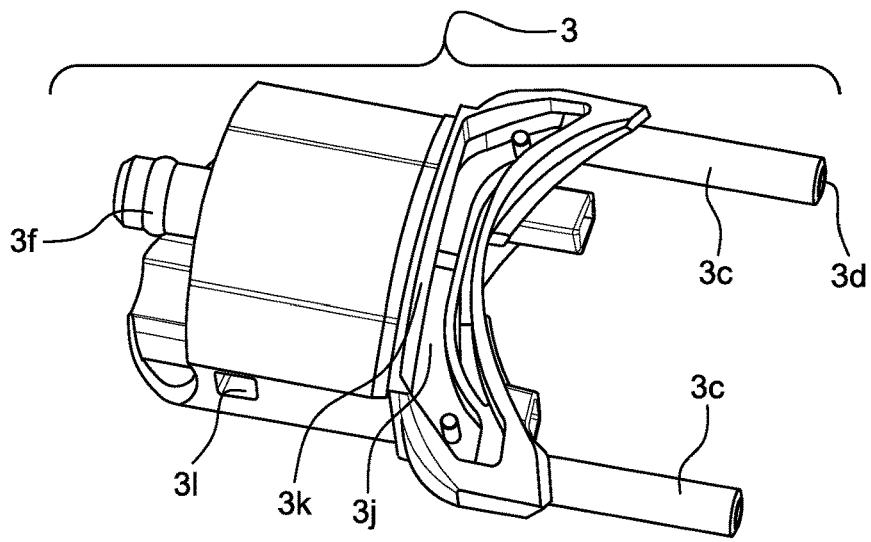
FIG. 5a is bottom view of one embodiment of the mouthpiece coupler 3, according to some embodiments.

FIG. 5a is bottom view of one embodiment of the mouthpiece coupler 3, wherein are depicted embodiments of the coupler soft body vacuum tube 3c which is made of a hard plastic or other hard material and which inserts into the soft body vacuum tube 17 so as to reduce the possibility of collapse of the soft body vacuum tube when the patient closes his/her teeth onto the upper 14 and lower 15 soft body floors of the mouthpiece 1 and also aids to secure the coupler 3 to the soft body 2 of the mouthpiece 1, a coupler soft body vacuum tube hole 3d, a coupler heating module vacuum tube O-ring 3f, which aids in achieving a fluid seal of the coupler heating module vacuum tube 3b to the heating module unit 30, a coupler vacuum tube reservoir 3j which collects used treatment material that has been sucked through the coupler soft body vacuum tube into the coupler vacuum tube port 3k by the applied vacuum force from a control unit, and then into the coupler heating module vacuum tube 3b. Additionally, depicted is an embodiment of the coupler heating module clip holders 3*l* of the coupler 3, to which is secured the heating module unit 30 (depicted in FIGS. 8*a* and 8*b*).

Figure 5B:
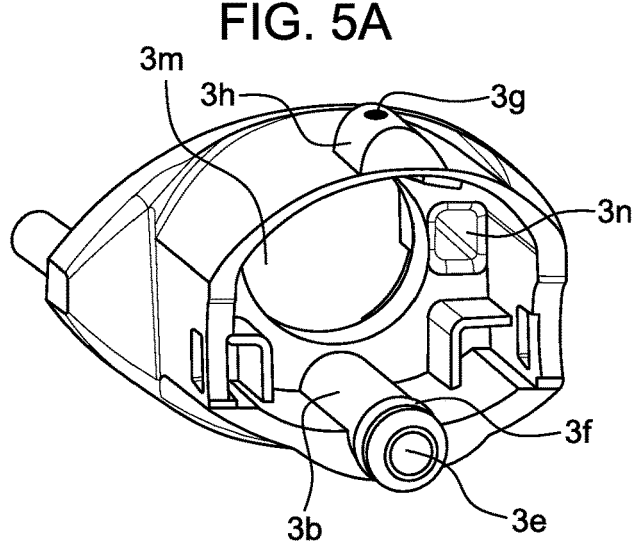
FIG. 5b is an angled front view of the mouthpiece coupler 3, according to some embodiments.

FIG. 5*b* is an angled front view of the mouthpiece coupler 3 of FIG. 5*a* wherein are depicted a coupler heating module vacuum tube 3*b*, a coupler heating module vacuum tube hole 3*e*, a coupler heating module vacuum tube O-ring 3*f*, a coupler magnet housing 3*h*, and coupler magnet hole 3*g* for housing a coupler magnet 28 (depicted in FIG. 7), and a coupler heating module port 3*m* for the insertion of the heating module unit 30 into the mouthpiece coupler 3. Additionally, embodiments of the coupler breathing passage holes 3*n* are depicted, which align with the soft body breathing passages 22 of the soft body 2 when the mouthpiece coupler 3 is attached to the soft body 2.

Figure 5C:
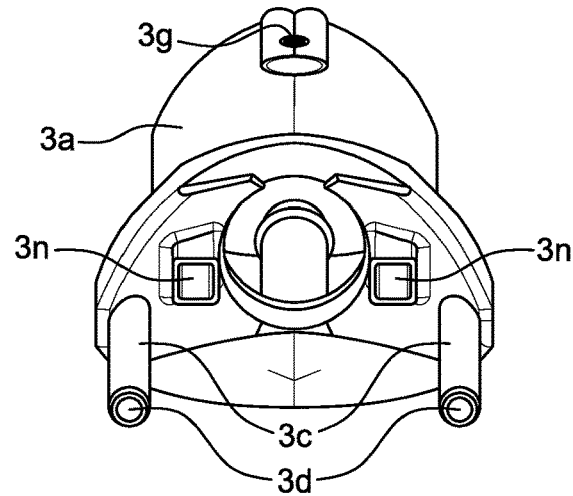
FIG. 5c is a rear view of the mouthpiece coupler 3, according to some embodiments.

FIG. 5*c* is a rear view of the mouthpiece coupler 3 of FIG. 5*a* wherein are depicted a coupler heating module receptacle 3*a* for gripping the heating module unit 30, coupler soft body vacuum tubes 3*c*, coupler soft body vacuum tube holes 3*d*, coupler breathing passage holes 3*n*, and a coupler magnet hole 3*g*.

In some embodiments, vacuum tubes 3C may be designed with a sufficient length to provide a strengthened structure to prevent closing of the vacuum tube even if a patient bites or applies a large amount of pressure on the soft body elements of the mouthpiece, when mouthpiece coupler 3 is connected to the soft body mouthpiece 2.

In some embodiments, vacuum tubes 3C may be designed to mechanically connect to, and optionally lock onto, soft body mouthpiece 2.

Figure 6A:
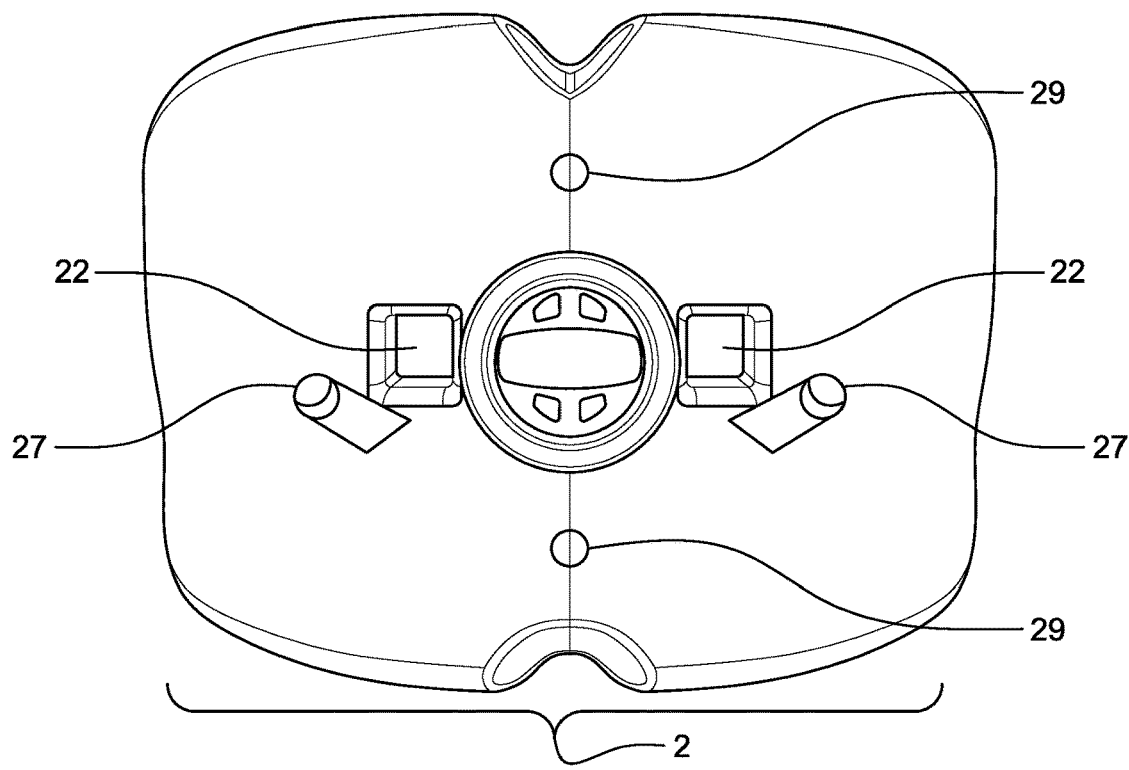
FIG. 6a is a front view of one embodiment of the soft body 2, according to some embodiments.

FIG. 6*a* is a front view of one embodiment of the soft body 2 wherein are depicted embodiments of the soft body breathing passages 22, soft body vacuum tube entry holes 27 for the insertion of the coupler soft body vacuum tubes 3*c* into the soft body 2, and the Soft Body Indexing Depressions 29, for accurately positioning and connecting the mouthpiece coupler 3 with the soft body 2.

Figure 6B:
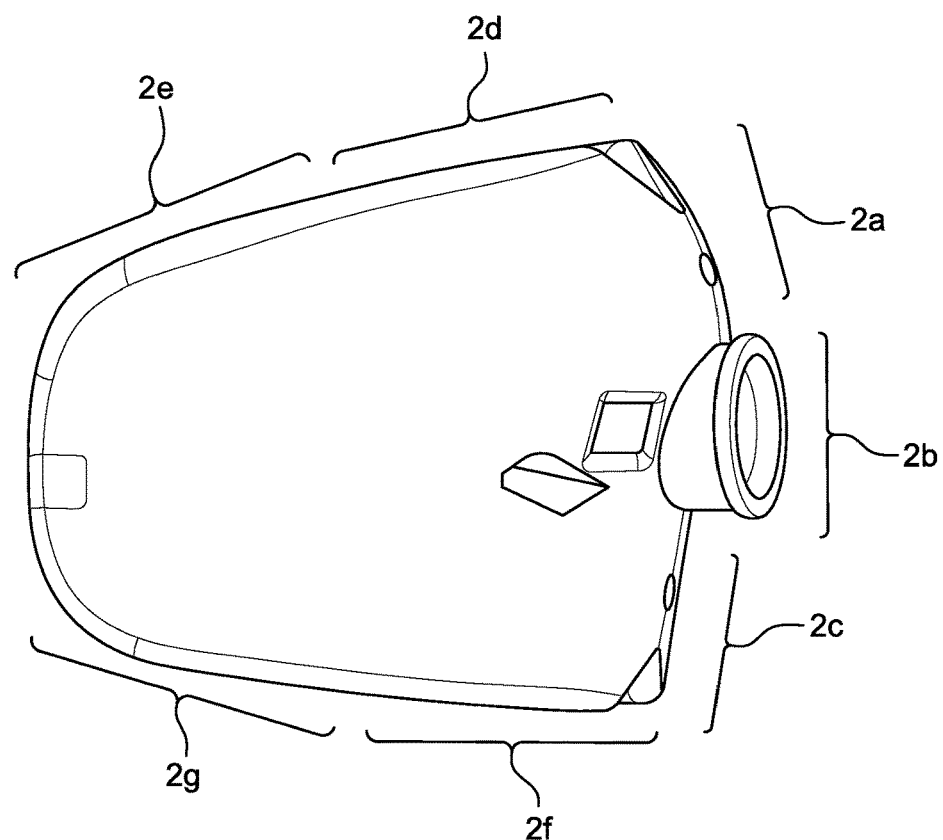
FIG. 6b is a side view of the soft body 2 of FIG. 6a, according to some embodiments.

FIG. 6*b* is a side view of the soft body 2 of FIG. 6*a* wherein are depicted the soft body upper section 2*a*, the soft body middle section 2*b*, the soft body lower section 2*c*, the soft body upper anterior section 2*d*, the soft body upper posterior section 2*e*, the soft body lower anterior section 2*f*, and the soft body lower posterior section 2*g*.

Figure 7:
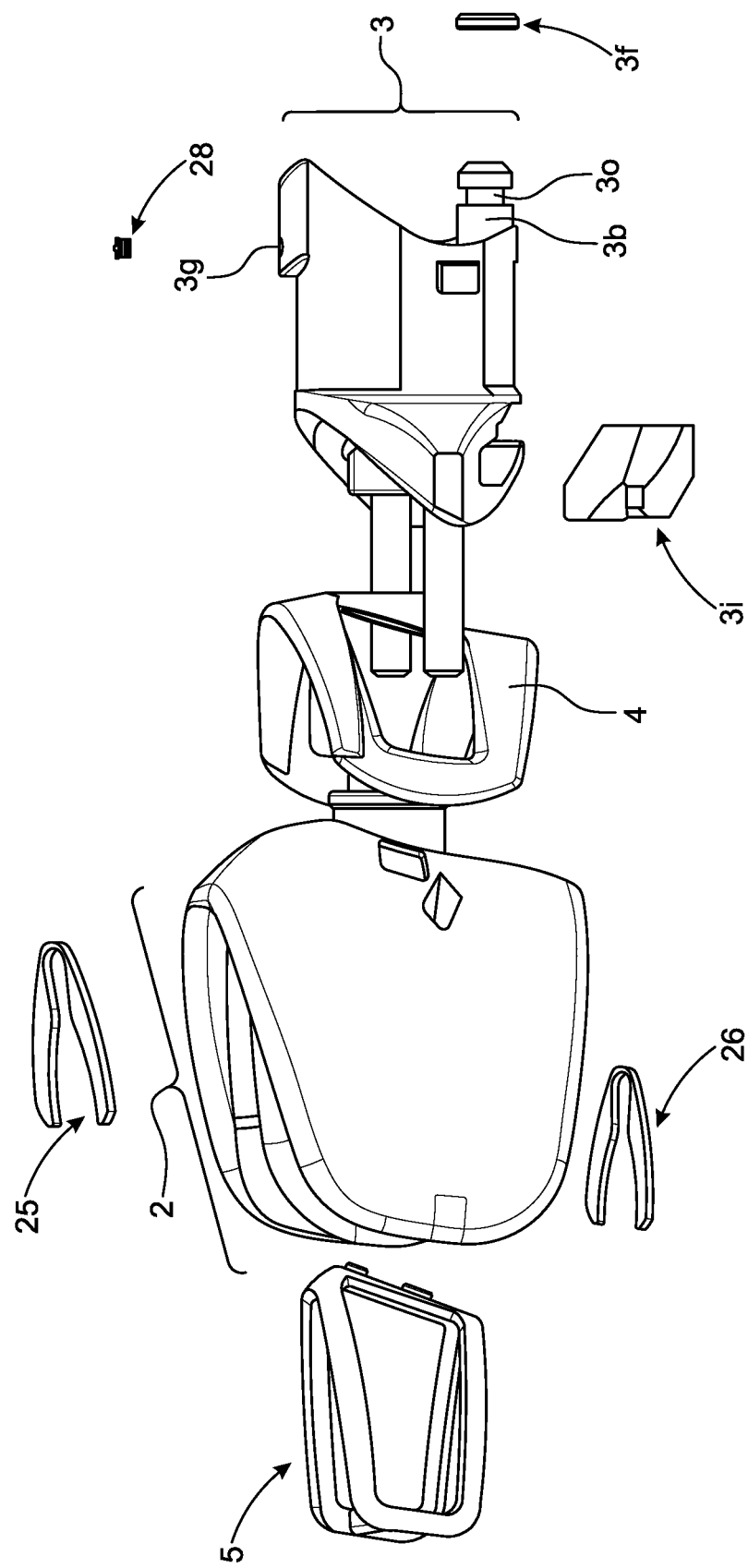
FIG. 7 is an exploded view of embodiments of the components of the mouthpiece 1, according to some embodiments.

FIG. 7 is an exploded view of embodiments of the components of the mouthpiece 1 wherein are depicted the soft body 2, the buccal stiffening element 4, and lingual stiffening element 5, the mouth piece coupler 3, and coupler vacuum tube O-ring notch 3*o*, which houses the coupler heating module vacuum tube O-ring 3*f*, and the coupler vacuum tube reservoir plug 3*i*, which fluidly seals the coupler vacuum tube reservoir 3*j*. Further depicted are the upper bite plate 25 and lower bite plate 26 constructed of hardened plastic or very high shore rubber/elastomeric materials for positioning and creating a rest stop for the upper and lower teeth respectively, and the coupler magnet 28, which verifies electromagnetically a proper connection of the mouthpiece 1 to the heating module unit 30. In accordance with some embodiments, buccal stiffening element 4, lingual/palatal stiffening element 5, and/or other hardening elements, may be embedded or otherwise integrated into soft body 2.

Figure 8:
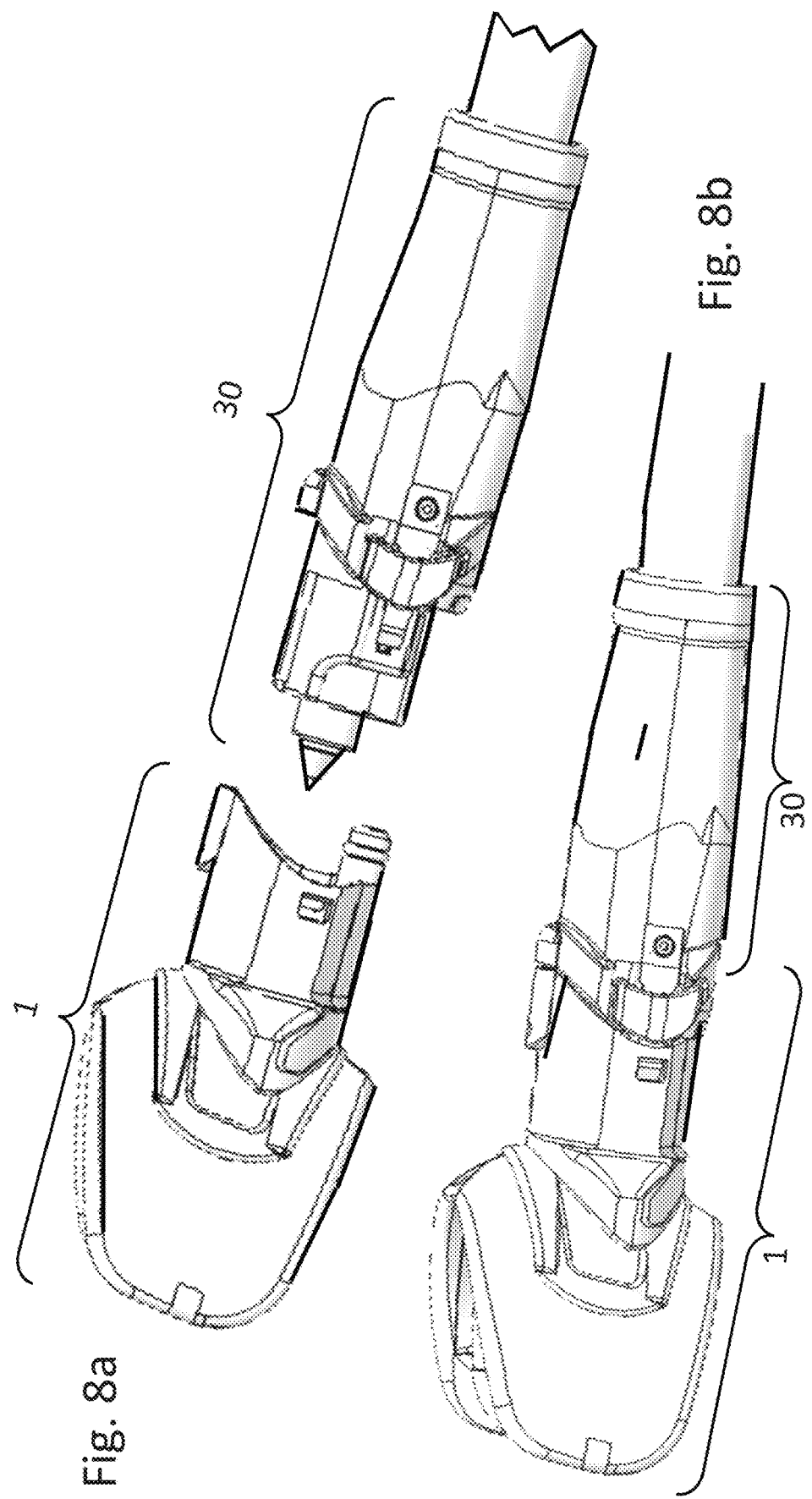
FIG. 8a is a side view of embodiments of the mouthpiece 1 and the heating module unit 30, according to some embodiments.
FIG. 8b is a side view of embodiments of the mouthpiece 1 connected to the heating module unit 30, according to some embodiments.

FIG. 8*a* is a side view of embodiments of the mouthpiece 1, wherein the mouthpiece is coupled to the mouthpiece coupler 3, and is viewed adjacent to a heating module unit (HMU) 30, which is designed to heat up treatment and/or cleaning materials flowing into the mouthpiece and act as a conduit to the connected tube set for in-flow into the mouthpiece from the control unit treatment cartridge and vacuum line out-flow to the control unit waste container (not depicted).

FIG. 8*b* is a side view of embodiments of the mouthpiece 1, wherein the mouthpiece soft body 2 is coupled to the mouthpiece coupler 3, and is connected to the HMU 30.

Figure 9:
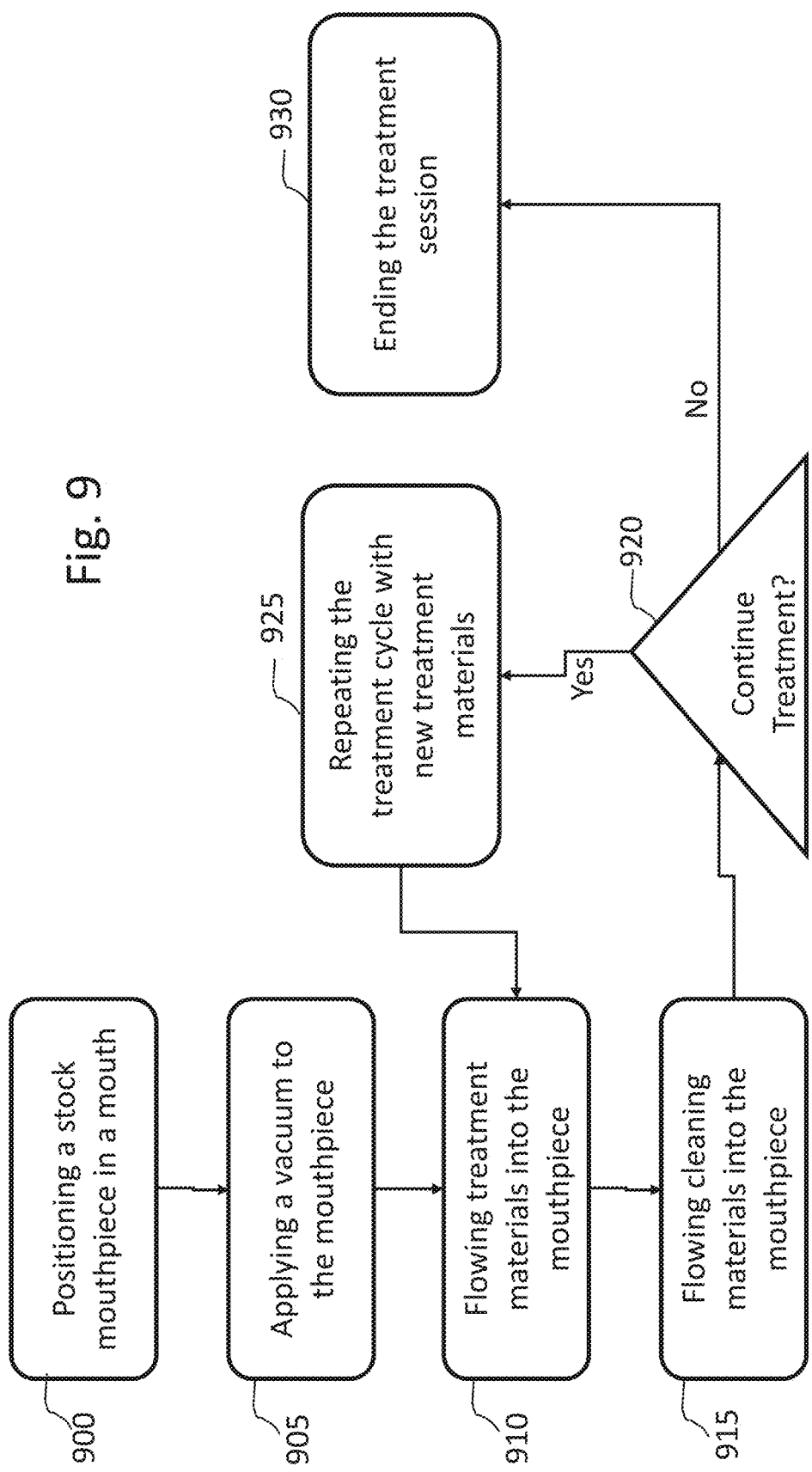
FIG. 9 is a flow chart describing an example of a process of implementing a gum treatment using a mouthpiece and associated components as described herein, according to some embodiments.

FIG. 9 is a flow chart describing an example of a process of implementing a gum treatment using a mouthpiece and associated components as described herein, according to some embodiments. As can be seen, a method for executing a dental treatment is provided herein, according to some embodiments, which may include one or more of the following steps: at step 900, positioning a mouthpiece including one or more dental cover layers over upper and/or lower teeth; at step 905, applying a vacuum to the dental cover layers so that a treatment cavity having a pressure below ambient pressure is formed around the upper and or lower teeth and/or surrounding gums respectively, thereby generating a fluid seal of the cover layer to the gum ridges; at step 910, flowing one or more treatment materials into the sealed treatment cavity or cavities; at step 915, cleaning the mouthpiece and/or anatomy of treatment materials, by flowing cleaning materials, such as water, optionally mixed with air at high velocity, into the mouthpiece and then flowing air alone to dry the teeth and or surrounding gums; at step 920, considering whether to continue the treatment; if there is a need to continue the treatment session ("Yes"), at step 925, the cycle is repeated, optionally using the same or new and/or alternative treatment materials, by returning to step 910, optionally n times as per a pre-planned and/or dynamic treatment plan; if there is NO need to continue the treatment session ("No"), the treatment session is ended at step 930.

In some embodiments, after step 905, the system may verify the vacuum status, and either modify the vacuum pressure if required and/or modify the treatment protocol, if required, in relation to the actual vacuum pressure.

In some embodiments the system may verify vacuum status continuously throughout the treatment and may modify output of the vacuum pumps to maintain proper vacuum level throughout the treatment.

In some embodiments, if the vacuum level in the mouthpiece cannot be maintained at a proper level to assure fluid seal of the mouthpiece when flowing in materials or cleaning fluids, the system will automatically stop in-flow of material into the mouthpiece.

In some embodiments, step 905 is designed to maintain the integrity of the soft material of the mouthpiece at or adjacent to the hardened stiffening elements, to enable treatment cavities, pockets, zones or areas to be left intact in selected locations, for example, around selected teeth, gums, ridges etc. Further, step 905 is designed to selectively collapse the soft material of the mouthpiece, to enable collapsed elements to provide a fluid seal at selected locations in the mouth, for example, around selected teeth, gums, ridges or selected portions of the gum ridges etc. In this way, treatment may be optimized, by creating selected treatment areas where treatment materials are optimally exposed, and where saliva is substantially prevented from entering, so as not to dilute or interfere with treatment materials. Further, treatment may be optimized, by creating safe zones where treatment materials are prevented from being exposed, thereby enhancing safety of gums, teeth etc. in these safe zones.

In some embodiments, at step 910, new or alternative treatment materials may be flowed into the mouthpiece, to provide optimal amounts of active treatment materials.

In some embodiments, at step 915, cleaning materials may include a water-air mixture, or alternative materials, liquids, gels etc., to enable removal of remaining treatment materials left on the mouthpiece, gum guard where present, and/or target teeth or tissues, optionally using high velocity flow, high temperature and/or other means to mechanically and/or chemically remove unwanted remains of treatment materials.

In some embodiments, at step 915, flowing of cleaning materials may be followed by flowing of air into the mouthpiece, to enable drying of the mouthpiece, gum guard where present, and/or target teeth or tissues, to prepare a target surface for an additional treatment cycle, for example by removing any covering layers that may compromise exposure to treatment materials.

According to some embodiments, the running of one or more cycles may be a fully automated process, defined by a pre-set treatment protocol. In other embodiments, the running of one or more cycles may be a semi-automated process, defined by a treatment protocol. In other embodiments, the running of one or more cycles may be a manual process, defined by a treatment protocol. In still further embodiments, treatment cycle changes and modifications may be applied during a cycle and/or a treatment session. For example, if there is a need, a session or cycle can be paused or stopped, in which case the system may turn off and/or recalibrate, reset, review and continue the session when instructed.

In some embodiments, after step 915 and/or 930, treatment and/or cleaning waste materials may be stored in a waste unit and/or may be drained out of the system directly, optionally at the end of a treatment cycle and/or at the end of a treatment session.

Figure 10:
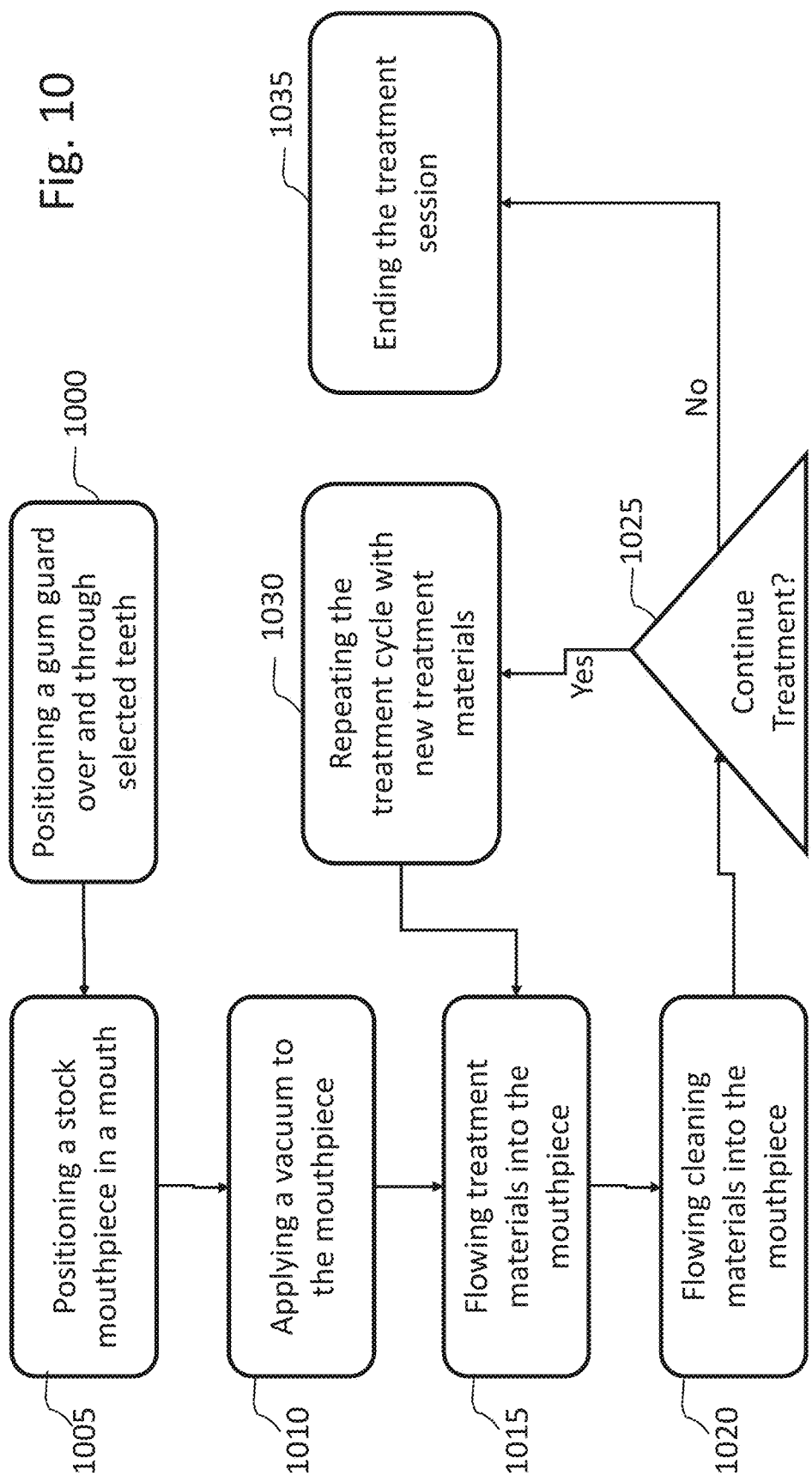
FIG. 10 is a flow chart describing an example of a process of implementing a tooth whitening treatment using a mouthpiece, gum guard, and associated components as described herein, according to some embodiments.

FIG. 10 is a flow chart describing an example of a process of implementing a tooth whitening treatment using a mouthpiece and associated components as described herein, according to some embodiments. As can be seen, a method for executing a dental treatment is provided herein, according to some embodiments, which may include one or more of the following steps: at step 1000, a gum guard is positioned over and through selected teeth, to expose the erupted portions of the teeth yet leave the surrounding gums protected; at step 1005, positioning a mouthpiece including one or more dental cover layers over upper and/or lower teeth; at step 1010, applying a vacuum to the dental cover layer so that a treatment cavity having a pressure below ambient pressure is formed around the teeth and/or surrounding gums, thereby generating a fluid seal; at step 1015, flowing one or more treatment materials into the sealed treatment cavity; at step 1020, cleaning the mouthpiece and/or anatomy of treatment materials, by flowing cleaning materials, such as water and or water mixed with air, and then flowing air alone optionally at high velocity, into the mouthpiece; at step 1025, considering whether to continue the treatment; if there is a need to continue the treatment session ("Yes"), at step 1030 the cycle is repeated, optionally using the same or new and/or alternative treatment materials, by returning to step 1015, optionally n times as per a pre-planned and/or dynamic treatment plan; if there is NO need to continue the treatment session ("No"), the treatment session is ended at step 1035.

In some embodiments, a pressure sensor may be incorporated in the pump mechanism to monitor the internal pressure inside the mouthpiece device throughout the treatment. In one example, increasing pressure inside the mouthpiece signifies degradation of the vacuum seal integrity and increase the potential risk that treatment materials will leak out of the mouthpiece and into the patient's mouth or alternatively, allow saliva to enter into the mouthpiece. Both possibilities are undesirable.

Chemically active treatment materials, such as whitening agents, may release, for example, oxygen during its oxidation/whitening reaction. This release of free oxygen from a gel may increase the internal pressure inside the mouthpiece device. In some embodiments, if the internal pressure (monitored by the pressure sensor and the microprocessor) reaches a critically high value, the patient may be told to bite down harder on the mouthpiece and the system will automatically begin evacuating the treatment materials contained within the mouthpiece and either pump in water to rinse the teeth or alternatively, pump in new treatment material. Alternatively, removing overactive treatment material present in the mouthpiece with fresh treatment material(s) may help in decreasing the internal pressure inside the mouthpiece and so allow for continuing the treatment without the need to rinse the teeth.

The above described features of the system allow for the easy and rapid removal of treatment material and from the mouthpiece device so that upon removing the mouthpiece device from the patient, there remains little of the spent treatment material both in the mouthpiece device itself and on the enamel surfaces of the treated teeth. This simplifies the operator's task of removing any partially or completely spent treatment material from the patient's mouth. In some implementations, the controlled removal of the spent treatment materials may be automated by the control unit at the end of a set period of time or manually initiated by the operator's pressing a button which activates the removal/suctioning of the material at any time during the treatment.

More importantly, applying material in waves or pulses punctuated by washing/drying cycles between each material application allows the previously applied wave or pulse of material to be substantially removed and replaced with new fresh material. Using this application and removal method, it is possible to maximize the surface contact and exposure of the full volume available of the various treatment materials to the surfaces of the teeth and or surrounding gums.

In some embodiments, several applications (of a volume of gel required to fill the mouthpiece) of fresh treatment materials may be so applied and removed until the operator and patient are satisfied with the whitening or other treatment results are achieved. Of course, any combination of the above steps may be implemented. Further, other steps or series of steps may be used.

In the respective embodiments of the present invention, the above described design elements allow for the rapid, intense and controlled whitening of a dental arch or arches of both the anterior and posterior teeth simultaneously and the whitening of both the outer (buccal), inner (lingual) and occlusal (top/biting) surfaces of both the anterior and posterior teeth. These embodiments further enable effectively protecting the patient's soft tissues from the caustic effects of the various concentrations of whitening agents applied to the teeth, whilst optionally maintaining and monitoring in real time the safety, progress and/or comfort of the patient throughout the treatment.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

The principles and operation of the device, and method according to the present invention may be better understood with reference to the drawings, and the following description, it being understood that these drawings are given for illustrative purposes only and are not meant to be limiting, wherein:

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are not intended to cover all such modifications and changes as fall within the true spirit of the invention.

What is claimed is:

1. A mouthpiece suitable for implementing a dental treatment, the mouthpiece comprising:
   i. a compressible soft body dental cover section that is configured to cover a dental arch, the cover section composed of one or more elastomeric materials and comprising a well suitable for forming a fluid sealed treatment cavity having a vacuum below ambient pressure, wherein the dental cover section that is configured to cover the dental arch includes a section over the teeth and surrounding gums, and wherein the one or more elastomeric materials are soft and have low shore hardness;
   ii. one or more treatment supply sections wherein the treatment supply section has one or more flow channels in fluid communication with the treatment cavity so that the treatment supply section can deliver and/or remove one or more treatment fluids from the treatment cavity; and
   iii. one or more separate rigid stiffening elements coupled to the soft body dental cover section,
   wherein, when an internal vacuum force is applied to the fluid sealed treatment cavity, the dental cover section collapses due to collapse of the one or more elastomeric materials, while the one or more separate rigid stiffening elements resist collapse,
   wherein the one or more rigid stiffening elements form an endo-skeleton by being partially or fully embedded inside the soft body dental cover section, and
   wherein the soft body dental cover section is over-molded over the one or more rigid stiffening elements.

2. The mouthpiece of claim 1, wherein the dental cover vacuum is formed using a continuous sealing mechanism that includes a collapsible sealing border rim formed of a compressible material in conjunction with one or more distal sealing plugs formed of a compressible material at the rear opening(s) of the soft body dental cover section, wherein the sealing mechanism fluidly seals the treatment cavity when the collapsible sealing border rim collapses on to the gum ridges and the teeth are engaged into the distal sealing plugs.

3. The mouthpiece of claim 2, wherein said sealing mechanism is adapted to prevent saliva from entering the treatment cavity and is adapted to prevent treatment material from exiting the treatment cavity.

4. The mouthpiece of claim 1, wherein the treatment supply section is configured to heat a treatment material, to heat at least a portion of the treatment cavity; or both.

5. The mouthpiece of claim 4, wherein the treatment material is heated to 56 degrees Celsius or above.

6. The mouthpiece of claim 1, further comprising a handle integrated into the treatment supply section suitable for: inserting the soft body dental cover section over the teeth and surrounding gums, for adjusting the position of the soft body dental cover section, for removing the soft body dental cover section after a dental treatment is completed, or any combination thereof, and for securely connecting with a fluid seal to a heating unit connected to a fluid and or vacuum supply line.

7. The mouthpiece of claim 6, wherein the handle comprises one or more inflow tubes for flowing one or more treatment materials into the treatment supply section(s); and one or more outflow tubes for flowing one or more treatment materials out of the treatment supply section(s).

8. The mouthpiece of claim 1, further comprising a power line for delivering an electrical current to the treatment supply section and one or more tubes for delivering and/or extracting one or more treatment materials to the treatment supply section, the handle includes the power line; or both.

9. The mouthpiece of claim 1, wherein the soft body dental cover section covers the gum ridges.

10. The mouthpiece of claim 1, further comprising two of the soft body dental cover sections for covering the teeth and surrounding gums; at least one treatment supply section interposed between the two soft body dental cover sections to enable the teeth and surrounding gums to be treated simultaneously; wherein the mouthpiece further comprises one or more breathing vents in the treatment supply section suitable for providing an air passage into the mouth during a dental treatment.

11. The mouthpiece of claim 1, further comprising one or more delivery holes for flowing a treatment material from the treatment supply section to the treatment cavity, and one or more drainage holes for flowing a treatment material from the treatment cavity to the treatment supply section; and wherein the treatment supply section includes one or more delivery channels for transporting a treatment material from an inflow tube to the treatment cavity and one or more drainage channels for transporting a treatment material from one or more drainage holes to an outflow tube.

12. The mouthpiece of claim 1, wherein the soft body dental cover section comprises one or more compressible distal sealing plugs suitable for sealing the cavity to prevent material flow out of the rear sides of the vacuum forming section.

13. The mouthpiece of claim 1, wherein the dental cover section comprises a circumferential roll border apron design to conform to the buccal and or palatal/lingual aspects of the gum ridges; the dental treatment supply section is between upper and lower portions of the soft body dental cover section, and/or the mouthpiece is shaped to mirror a hinge axis angle to facilitate natural jaw movement.

14. The mouthpiece of claim 1, wherein said fluid sealed vacuum is formed via the treatment supply section, by reducing the pressure in the one or more dental treatment cavities below ambient pressure, and maintains said vacuum when flowing treatment materials into said dental treatment cavities.

15. The mouthpiece of claim 1, wherein the device further comprising an elastomeric dental gum guard component that is adaptable to selectively cover the upper and or lower gum ridges for additional protection against treatment materials, wherein the elastomeric dental gum guard component is made of one or more materials that are fluid impermeable and gas permeable.

16. The mouthpiece of claim 1, wherein the mouthpiece is further configured to deliver one or more therapeutic material to the gums.

17. The mouthpiece of claim 1, further comprising a rigid mouthpiece coupler that fluidly connects to both the soft body dental cover section and the one or more treatment supply sections.

18. The mouthpiece of claim 17, wherein the one or more treatment supply sections comprises one or more vacuum tubes, and wherein the rigid mouthpiece coupler comprises one or more rigid vacuum tube extensions that insert into the one or more vacuum tubes.

19. A mouthpiece suitable for implementing a dental treatment, the mouthpiece comprising:
  i. a compressible soft body dental cover section that is configured to cover a dental arch, the cover section composed of one or more elastomeric materials and comprising a well suitable for forming a fluid sealed treatment cavity having a vacuum below ambient pressure, wherein the dental cover section that is configured to cover the dental arch includes a section over the teeth and surrounding gums, and wherein the one or more elastomeric materials are soft and have low shore hardness;
  ii. one or more treatment supply sections wherein the treatment supply section has one or more flow channels in fluid communication with the treatment cavity so that the treatment supply section can deliver and/or remove one or more treatment fluids from the treatment cavity; and
  iii. one or more separate rigid stiffening elements coupled to the soft body dental cover section,
  wherein, when an internal vacuum force is applied to the fluid sealed treatment cavity, the dental cover section collapses due to collapse of the one or more elastomeric materials, while the one or more separate rigid stiffening elements resist collapse,
  wherein the one or more rigid stiffening elements are connected to at least one exterior surface of the soft body dental cover section such that the one or more rigid stiffening elements form an exoskeleton with respect to the soft body dental cover section,
  wherein the one or more rigid stiffening elements comprise a buccal stiffening element and a lingual/palatal stiffening element, wherein the at least one exterior surface comprises a buccal surface and a lingual/palatal surface, wherein the buccal stiffening element is connected to the buccal surface and the lingual/palatal stiffening element is connected to the lingual/palatal surface, and wherein, when the internal vacuum force is applied to the fluid sealed treatment cavity, (i) the buccal stiffening element prevents collapse of the buccal surface, and (ii) the lingual/palatal stiffening element prevents collapse of the lingual/palatal surface.

20. A method for executing dental treatments, comprising:
  positioning a mouthpiece comprising a dental arch soft body cover section over a user's teeth and surrounding gums;
  applying a fluid sealed vacuum to a treatment cavity formed by the dental arch soft body cover section so that a fluid sealed treatment cavity having a pressure below ambient pressure is formed around the teeth and surrounding gums;
  flowing one or more treatment materials into the fluid sealed treatment cavity; and
  flowing out the one or more treatment materials from the fluid sealed treatment cavity to a waste container,
  wherein the dental arch soft body cover section comprises an arch-shaped portion and separate hardened sections coupled to the arch-shaped portion,
  wherein the arch-shaped portion is composed of one or more soft elastomeric materials that have low shore hardness such that the arch-shaped portion collapses when exposed to the vacuum pressure due to collapse of the one or more elastomeric materials,
  wherein the separate hardened sections are composed of rigid materials that do not collapse when exposed to the vacuum pressure, thereby enabling selected/differential collapsibility of the mouthpiece when exposed to the vacuum pressure,
  wherein the separate hardened sections further comprise:
    one or more rigid buccal stiffening elements disposed on, and connected to, a buccal surface of the dental arch soft body cover section; and
    one or more rigid lingual/palatal stiffening elements disposed on, and connected to, a lingual/palatal surface of the dental arch soft body cover section,
  wherein the one or more rigid buccal stiffening elements do not collapse when a vacuum force is applied to the fluid sealed treatment cavity and wherein the one or more rigid lingual/palatal stiffening elements do not collapse when a vacuum force is applied to the fluid sealed treatment cavity, thereby maintaining an empty space between the teeth and the internal walls of the cover section surrounding gum ridges,
  wherein the one or more rigid buccal stiffening elements are connected to a mouthpiece coupler for the mouthpiece, and
  wherein the mouthpiece coupler comprises one or more vacuum tubes for generating the fluid sealed vacuum.

21. The method of claim 20, further comprising one or more of the following steps:
  configuring treatment settings on a control device for controlling a mouthpiece designed for a teeth whitening treatment;
  applying a gum guard device selectively onto the gum ridges where the erupted teeth remain substantially exposed;
  applying flow control to cause a vacuum fluid seal between the mouthpiece and the gum ridges; and/or
  applying flow control to automatically manage delivery of materials in accordance with said treatment settings, and/or using a flow control module to remove treatment materials from said mouthpiece.

22. The method of claim 21, further comprising monitoring the treatment to track conformance to a treatment plan.

23. The method of claim 21, further comprising monitoring the treatment to identify problems during the treatment.

24. The method of claim 23, wherein said treatment materials differ with respect to the temperature of the materials, with respect to the concentration of the materials, or both.

25. The method of claim 21, wherein the method is utilized for executing a teeth whitening treatment.

26. The method of claim 20, wherein the plurality of rigid stiffening elements is attached externally to the dental arch soft body cover section such that the plurality of rigid stiffening elements forms an exoskeleton around the dental arch soft body cover section.

27. The method of claim 20, wherein the dental arch soft body cover section further comprises an upper portion that covers and fits over the user's upper teeth and upper surrounding gums, and a lower portion that covers and fits over the user's lower teeth and lower surrounding gums.

28. The method of claim 20, further comprising:
modifying a pressure of the fluid sealed vacuum when the applied fluid sealed vacuum has an incorrect pressure; and
automatically stopping the flowing of the one or more treatment materials into the fluid sealed treatment cavity when the applied fluid sealed vacuum has the incorrect pressure.

29. A device comprising:
a deformable elastomeric gum sealing portion for covering a gum ridge;
one or more hardened sections coupled to the gum sealing portion;
a distal tooth sealing portion, wherein the gum sealing portion and the distal tooth sealing portion define a gap between at least a portion of the device and the tooth and surrounding gum over which the device lies; and
at least one fluid conduit portion for passing a fluid into or out of the treatment cavity;
wherein, when the device is placed in a patient's mouth over a plurality of teeth, (i) the gum sealing portion contacts and deforms against a gum ridge of the patient for forming intimate contact with the gum ridge, and (ii) the distal tooth sealing portion deforms against a distally located tooth or teeth for substantially defining a seal at the distal tooth or teeth, so that a fluid can be introduced and/or removed from the treatment cavity while maintaining a seal with both the deformable gum portion and the distal tooth sealing portion, and
wherein the deformable gum sealing portion is collapsible such that, when an internal vacuum force is applied to the treatment cavity, the deformable gum sealing portion collapses while the one or more hardened sections resist collapse,
wherein the one or more hardened sections comprise one or more rigid stiffening elements,
wherein the one or more rigid stiffening elements form an endo-skeleton by being partially or fully embedded inside a soft body dental cover section, and
wherein the soft body dental cover section is over-molded over the one or more rigid stiffening elements.

\* \* \* \* \*